(12) United States Patent
Sengupta et al.

(10) Patent No.: US 8,509,099 B2
(45) Date of Patent: Aug. 13, 2013

(54) LOAD AWARE RESOURCE ALLOCATION IN WIRELESS NETWORKS

(75) Inventors: Sudipta Sengupta, Redmond, WA (US); Minghua Chen, Hong Kong (CN); Ranveer Chandra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1068 days.

(21) Appl. No.: 12/014,760

(22) Filed: Jan. 15, 2008

(65) Prior Publication Data
US 2009/0180431 A1 Jul. 16, 2009

(51) Int. Cl.
*H04W 84/00* (2009.01)
(52) U.S. Cl.
USPC ........... 370/252; 370/235; 370/254; 370/330; 370/337; 370/436; 370/437; 370/468
(58) Field of Classification Search
USPC .................. 370/252, 254, 330, 436, 437, 235, 370/337, 468
See application file for complete search history.

(56) References Cited

U.S. PATENT DOCUMENTS

| | | | | |
|---|---|---|---|---|
| 5,168,441 A * | 12/1992 | Onarheim et al. | ............... | 700/17 |
| 5,794,157 A * | 8/1998 | Haartsen | ........................ | 455/522 |
| 6,094,584 A * | 7/2000 | Khanna et al. | ................ | 455/512 |
| 6,418,398 B1 * | 7/2002 | Dueck et al. | .................. | 702/181 |
| 6,553,021 B1 * | 4/2003 | Bishop et al. | ................. | 370/347 |
| 6,754,499 B1 | 6/2004 | Smith | | |
| 6,829,216 B1 * | 12/2004 | Nakata | ........................... | 370/228 |
| 7,339,897 B2 * | 3/2008 | Larsson et al. | ................ | 370/252 |
| 7,471,243 B2 * | 12/2008 | Roslak | .......................... | 342/463 |
| 7,693,064 B2 * | 4/2010 | Thubert et al. | ................. | 370/235 |
| 7,693,939 B2 * | 4/2010 | Wu et al. | ......................... | 709/203 |
| 7,860,506 B2 * | 12/2010 | Jain et al. | ....................... | 455/446 |
| 8,214,526 B2 * | 7/2012 | Wu et al. | ......................... | 709/238 |
| 2002/0114309 A1 | 8/2002 | Chow et al. | | |
| 2002/0173341 A1 * | 11/2002 | Abdelmonem et al. | ....... | 455/561 |
| 2003/0161268 A1 * | 8/2003 | Larsson et al. | ................ | 370/229 |
| 2003/0219002 A1 * | 11/2003 | Kishida | ........................... | 370/338 |
| 2005/0075104 A1 | 4/2005 | Jain et al. | | |
| 2005/0180329 A1 | 8/2005 | Qiu et al. | | |
| 2005/0190731 A1 * | 9/2005 | Bejerano et al. | .............. | 370/338 |
| 2005/0277385 A1 * | 12/2005 | Daum | ......................... | 455/67.11 |
| 2006/0067258 A1 * | 3/2006 | Golestani et al. | ............. | 370/310 |
| 2006/0067267 A1 * | 3/2006 | Golestani et al. | ............. | 370/328 |
| 2006/0240835 A1 * | 10/2006 | Jain et al. | ....................... | 455/446 |
| 2007/0110104 A1 | 5/2007 | Sartori et al. | | |
| 2007/0147248 A1 * | 6/2007 | Kodialam et al. | ............. | 370/235 |

(Continued)

OTHER PUBLICATIONS

Gupta, et al., "Sufficient rate constraints for QoS flows in ad-hoc networks", Dec. 30, 2004, pp. 1-15.

(Continued)

*Primary Examiner* — Jay P Patel
(74) *Attorney, Agent, or Firm* — Westman, Champlin & Kelly, P.A.

(57) ABSTRACT

A technique for resource allocation in a wireless network (for example, an access point type wireless network), which supports concurrent communication on a band of channels, is provided. The technique includes accepting connectivity information for the network that supports concurrent communication on the band of channels. A conflict graph is generated from the connectivity information. The generated conflict graph models concurrent communication on the band of channels. A linear programming approach, which incorporates information form the conflict graph and rate requirements for nodes of the network, can be utilized to maximize throughput of the network.

20 Claims, 17 Drawing Sheets

(56) References Cited

U.S. PATENT DOCUMENTS

| | | | |
|---|---|---|---|
| 2007/0154223 A1* | 7/2007 | Newell et al. | 398/147 |
| 2007/0201398 A1 | 8/2007 | Yang et al. | |
| 2007/0223440 A1 | 9/2007 | Ho et al. | |
| 2008/0209333 A1* | 8/2008 | Frei | 715/736 |
| 2008/0298275 A1* | 12/2008 | De Sousa | 370/255 |
| 2009/0034457 A1* | 2/2009 | Bahl et al. | 370/329 |
| 2009/0054002 A1* | 2/2009 | Urushihara et al. | 455/67.13 |
| 2010/0031305 A1* | 2/2010 | Liva et al. | 725/127 |
| 2010/0150067 A1* | 6/2010 | Penisoara et al. | 370/328 |
| 2010/0188979 A1* | 7/2010 | Thubert et al. | 370/235 |

OTHER PUBLICATIONS

Wang, et al., "Scalable Multiple Channel Scheduling with Optimal Utility in Wireless Local Area Networks", Dec. 30, 2005. pp. 1-10.

"Distributed Channel Allocation in Multi-Radio Wireless Mesh Networks", http://ieeexplore.ieee.org/iel5/4317769/4317770/04317938.pdf?isnumber=4317770&prod=CNF&arnumber=4317938&arSt=939&ared=944&arAuthor=Avonts%2C+Jeroen%3B+Van+den+Wijngaert%2C+Nik%3B+Blondia%2C+Chris.

Ma, et al., "A Utility-Based Approach to Bandwidth Allocation and Link Scheduling in Wireless Networks", School of Engineering and Applied Science, Harvard University. pp. 1-8.

Iyer, et al., "What is the Right Model for Wireless Channel Interference?", QShine'06 The Third International Conference on Quality of Service in Heterogeneous Wired/Wireless Networks Aug. 7-9, 2006, Waterloo, ON, Canada. pp. 1-10.

Jain, et al., "Impact of Interference on Multi-hop Wireless Network Performance", ACM MOBICOM 2003, Sep. 14-19, 2003. pp. 1-14.

Gupta, et al., "The Capacity of Wireless Networks", IEEE Transactions on Information Theory, vol. 34, No. 5, pp. 910-917, 2000.

"ILOG CPLEX Optimization Suite", http://www.ilog.com/products/cplex/.

Sengupta, et al., "Resource Allocation in Access Point Type Wireless Networks", Microsoft Research, Redmond, WA, USA. pp. 1-6.

Gummadi, et al., "Wireless Networks Should Spread Spectrum On-Demand", MIT Computer Science and Artificial Intelligence Laboratory. pp. 1-6.

* cited by examiner

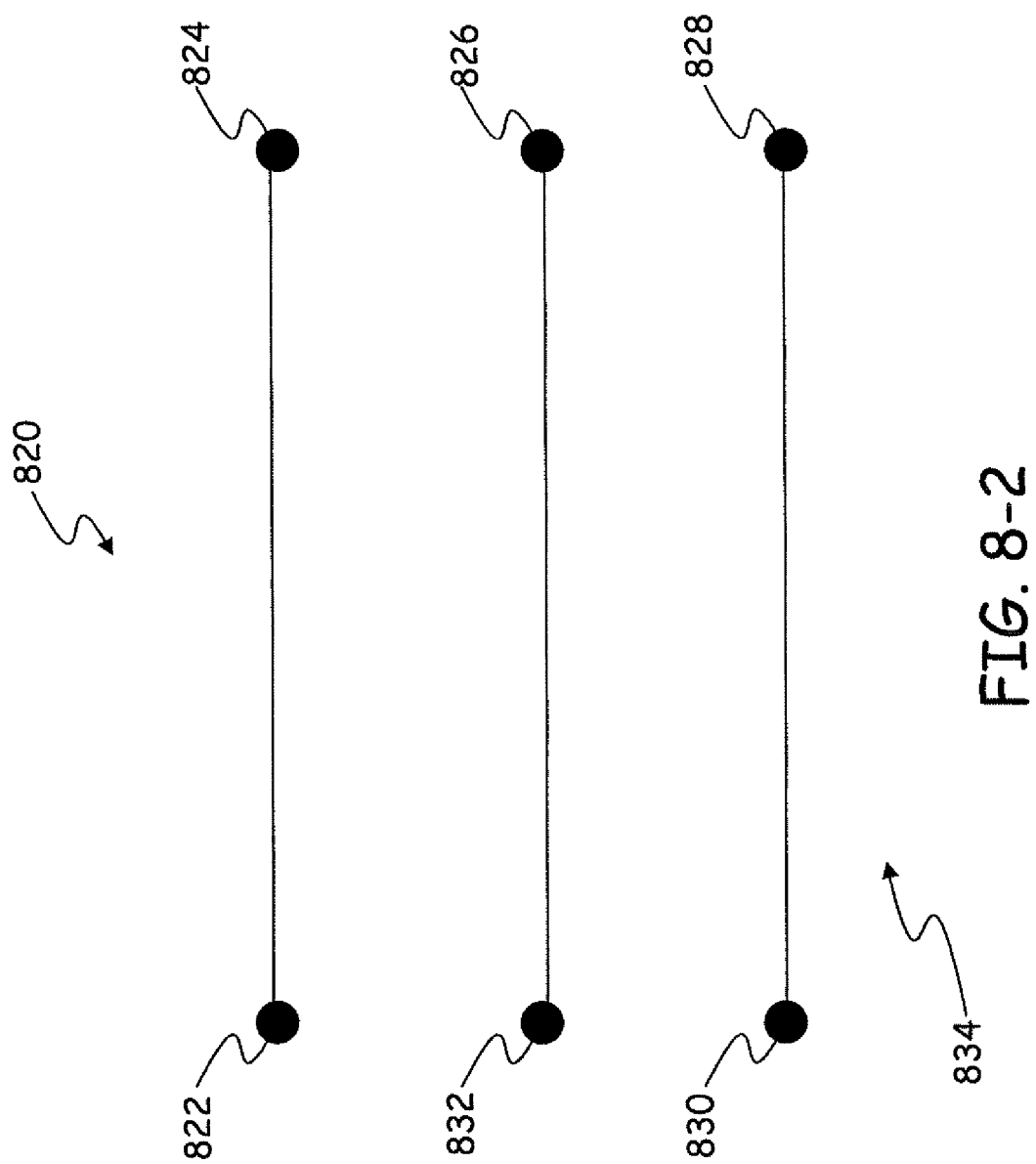

LOAD AWARE RESOURCE ALLOCATION IN WIRELESS NETWORKS

BACKGROUND

Wireless networking, where client devices such as wireless laptop and desktop computers are in radio communication, for example, with a network, is constantly changing and improving. In such wireless networks, the communication takes place, for example, between wireless adapters in the computers and wireless access points in the network. Recently, to meet the continuing rise in throughput requirements, multi-channel (two or more channel) wireless access points have been developed. However, utilizing multi-channel access points can increase the complexity of wireless transmission of information within the network.

The discussion above is merely provided for general background information and is not intended to be used as an aid in determining the scope of the claimed subject matter.

SUMMARY

The present embodiments provide methods and apparatus for resource allocation in wireless networks that support concurrent communication on a band of channels. The band of channels on which concurrent communication is supported may be multiple contiguous channels and/or multiple non-contiguous channels. An exemplary method embodiment includes accepting connectivity information for the network that supports concurrent communication on a band of channels. A conflict graph is generated from the connectivity information. The generated conflict graph models concurrent communication on the band of channels. In one embodiment, a linear programming approach, which incorporates information form the conflict graph and rate requirements for nodes of the network, is utilized to maximize throughput of the network. An apparatus that is capable of carrying out the above method embodiment is also provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3-1 is a diagrammatic illustration of a topology graph.

FIG. 3-2 is a diagrammatic illustration of a conflict graph generated from the topology graph of FIG. 1.

FIGS. 4-1 through 4-3 are diagrammatic illustrations that demonstrate how a conflict graph for contiguous channel band allocation can be constructed.

FIGS. 5-1 through 5-3 are diagrammatic illustrations that demonstrate how a conflict graph for non-contiguous channel band allocation can be constructed.

FIGS. 6-1 and 6-2 show an example network and its corresponding topology graph.

FIGS. 7-1 and 7-2 are diagrammatic illustrations of an example network and its corresponding conflict graph.

FIGS. 8-1 and 8-2 are diagrammatic illustrations of an example network and its corresponding conflict graph.

DETAILED DESCRIPTION

The present embodiments generally relate to resource allocation in wireless networks. Specific embodiments deal with resource allocation in terms of channelization strategies in access point type wireless networks, such as IEEE 802.11, WiMAX (Worldwide Interoperability for Microwave Access) and CDMA (Code Division Multiple Access). In general, when multiple channels are used for communication, WiFi (802.11) network hardware limits a subset of channels for a single transmission/reception to be contiguous. In contrast, this restriction is not present in WiMAX (or CDMA) where the subset of channels (or codes) used for a single transmission can be non-contiguous. The present embodiments address resource allocation in networks (for example, 802.11, WiMAX and CDMA based networks) by generating conflict graphs (graphs that incorporate wireless interference in networks). Given a generated conflict graph, a linear programming approach is applied to maximize network throughput, by performing channel allocation (or spread spectrum code allocation) and time-slot scheduling. Formulations where multiplexing occurs only in the frequency domain (channel allocations to access points do not change over time) are also provided.

Figure 1:
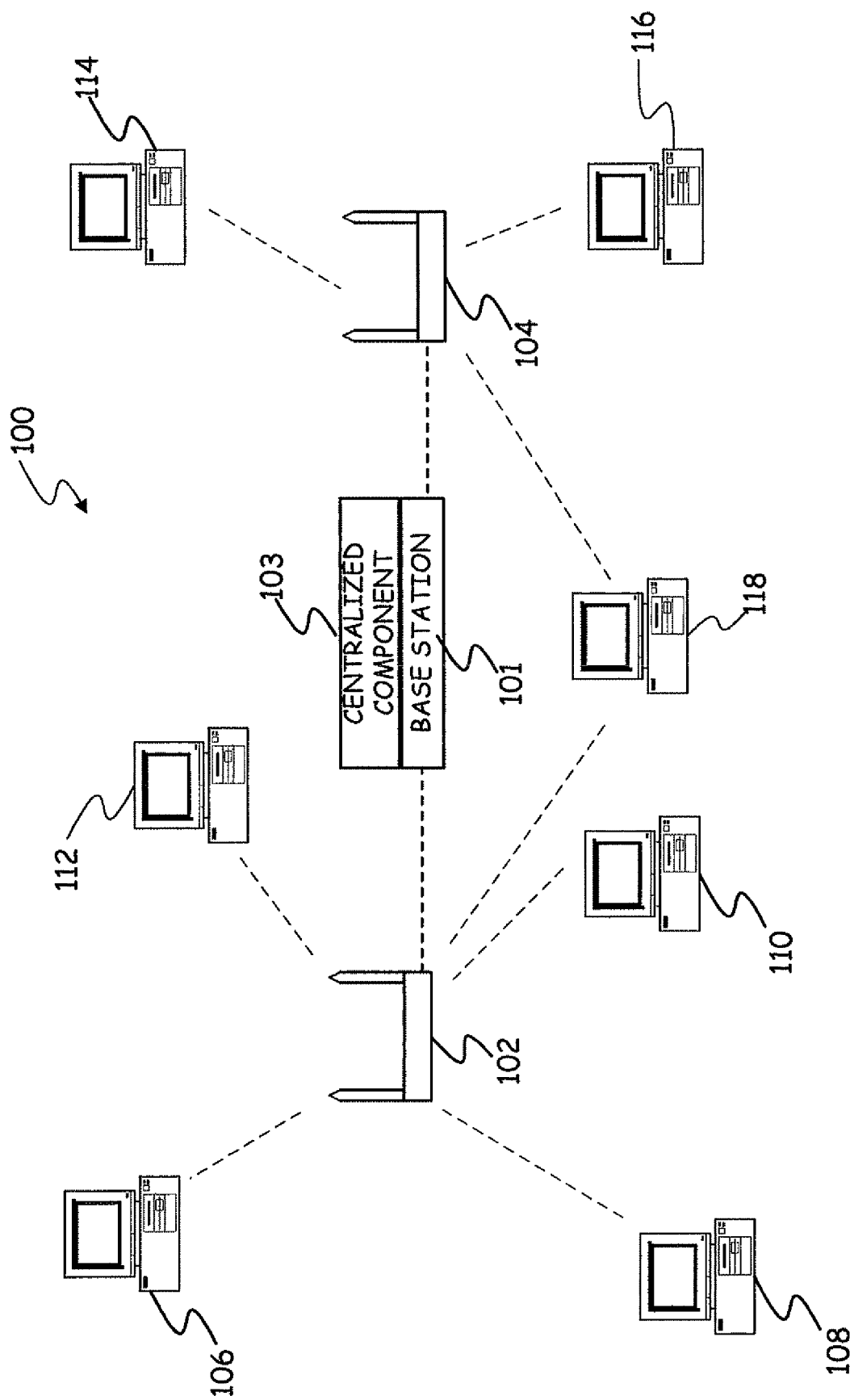
FIG. 1 is a simplified block diagram of a network that supports contiguous channel band communication.

FIG. 1 is a very simplified block diagram of a wireless network 100 in which wireless communication takes place between wireless adapters in computers, for example, and wireless access points.

In FIG. 1, two wireless access points 102 and 104, which are coupled to a base station 101, are shown. Client nodes (for example, computers) 106, 108, 110 and 112 wirelessly communicate with access point 102, and client nodes 114 and 116 communicate with access point 104. Client node 118, by virtue of its location, is capable of communicating with both access points 102 and 104. It should be noted that the wireless network with two access points is just an example and, in general, the wireless network can include any suitable number of access points, which are typically included based on the number and location of client nodes that need to be supported.

In access points 102 and 104, the available communication spectrum is divided in into a plurality of channels, where a channel is the lowest granularity at which the spectrum can be allocated. In the present embodiments, in general, communication can involve one or more of the plurality of channels, or equivalently, a variable spectrum width; hence, the spectrum is better utilized. In some specific embodiments, when multiple channels of the plurality of channels are used for communication, the multiple channels used have to be contiguous; hence the term "contiguous channel band" communication is used in connection with such embodiments. Other embodiments can include non-contiguous channel band communication.

As can be seen in FIG. 1, network 100 also includes a centralized component (for example, a network management server) 103, which includes information about the demand of each client node. In some embodiments, client node demand information is provided to centralized component 103 from any suitable external source. In other embodiments, centralized component 103 monitors network traffic during a particular time slot, estimates demand during the particular timeslot and, from the estimated demand information for the particular time slot, extrapolates rate needs for each client node for subsequent time slots. Also, in some embodiments, locations of primary network communication components (the base station, access points and client nodes) are fixed and therefore centralized component 103 can determine locations of these components using relatively simple triangulation techniques. Using the network connectivity information and rate requirements for each client node, the centralized component 103 determines a scheduling strategy for a next timeslot such that each client node's demand is met, and this determination is carried out in a manner that attempts to maximize network throughput, which is denoted by $\lambda$. As will be seen from a more detailed description further below, $\lambda$ is defined such that, if rates of all client nodes are known, it is desirable to achieve the rates multiplied by $\lambda$. In the attempt to maximize $\lambda$, if a value of at least 1 is obtained for $\lambda$, then a desired throughput is obtained. A value of less than 1 for $\lambda$ indicates that the demand on the network is greater than what it can handle. This is a signal for a network administrator that the network has to be upgraded at least over a period of time.

Figure 2:
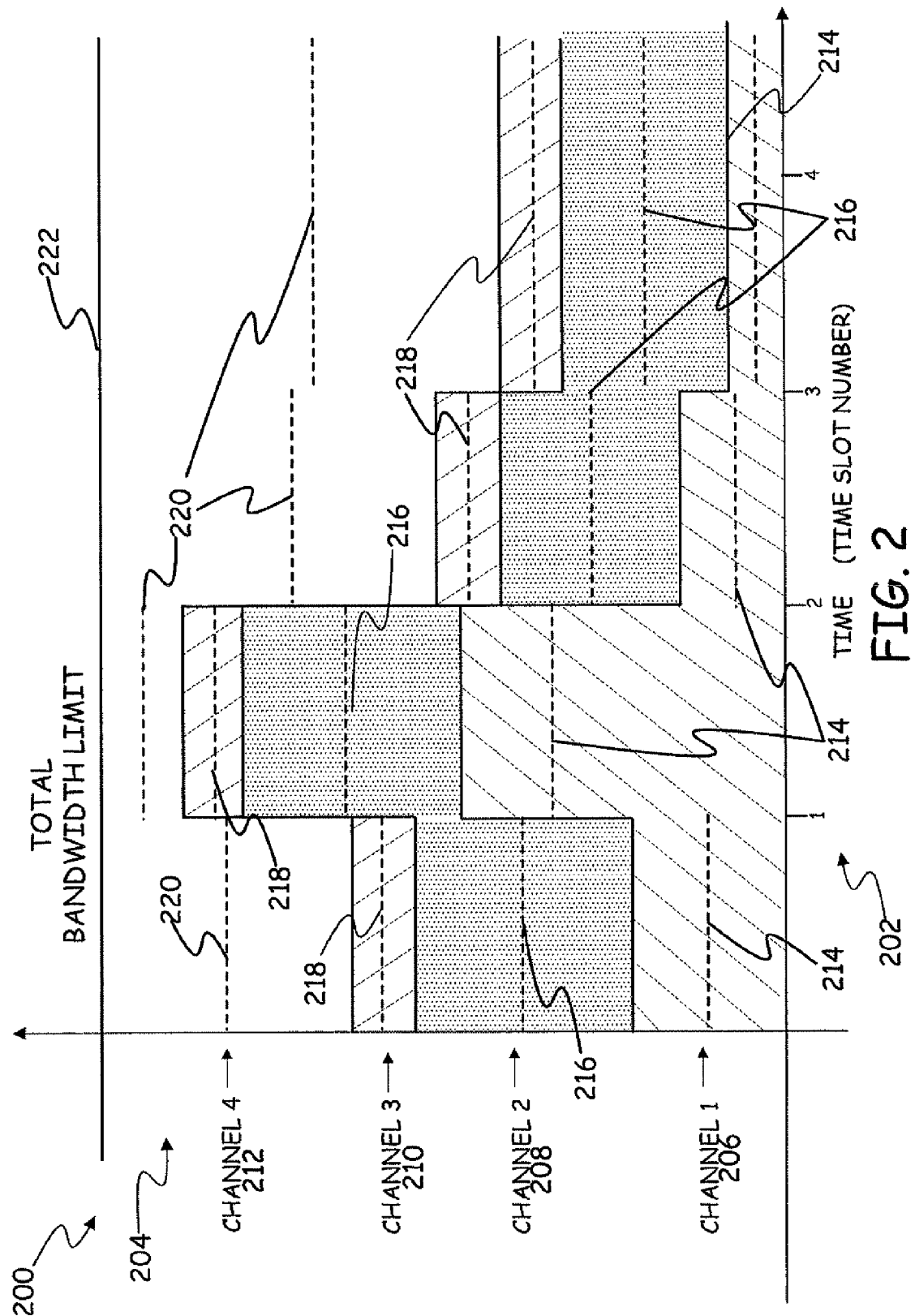
FIG. 2 is a graph showing an example of how allocation of contiguous channel bands can take place in an example network.

In general, in a wireless network such as the network of FIG. 1, there are multiple scenarios in which there can be interference during communication. For example, if two client nodes are in the range of two access points and each access point is transmitting to a respective client node, interference occurs if there is an overlap in communication bands. Further, when a client node is transmitting to an access point, it is interfering with other client nodes in its vicinity. Thus, the scheduling strategy implemented by centralized component 103 is modeled using a linear programming approach, which incorporates information form a conflict graph and rate requirements for nodes of the network, to maximize throughput of the network. FIG. 2, which is described below, is a graph 200 showing an example of how allocation of channel bands can take place over time in a network such as 100 of FIG. 1.

In FIG. 2, horizontal axis 202 is a time axis, which includes time slot numbers. Vertical axis 204 is a frequency axis. As can be seen in FIG. 2, the communication frequency spectrum extends from a lower frequency bound at horizontal axis 202 and an upper frequency bound, which is the total bandwidth limit represented by horizontal line 222. The communication frequency spectrum includes four channels: channel 1 (region with forward leaning dashed lines) denoted by reference numeral 206, channel 2 (dotted region) denoted by reference numeral 208, channel 3 (region with backward leaning dashed lines) denoted by reference numeral 210 and channel 4 (blank region) denoted by reference numeral 212. In this example, an access point, under the control of a centralized component such as 103 of FIG. 1, adaptively adjusts its center frequency and channel width to match its traffic load. Therefore, channel widths and center frequencies of channels 1, 2, 3 and 4, which are denoted by reference numerals 214, 216, 218 and 220, respectively, are adjusted at different times in FIG. 2 based on changes in load requirements. A detailed description of an exemplary linear programming approach that can be used to maximize network throughput in accordance with the present embodiments is provided below.

The following description addresses a resource allocation problem in a wireless network (for example, the wireless network of FIG. 1) under the protocol model of wireless interference. In formulations described below, channel allocation choices are modeled in a topology graph and the interference between link transmissions in the presence of channelization choices via a conflict graph. It will be demonstrated below that the formulation can model various channelization strategies relatively easily. As such, the formulation is powerful and flexible. As noted earlier, given a conflict graph, a linear programming approach is applied to maximize the network throughput, by performing channel allocation and time-slot scheduling.

Notation and Problem Formulation

Wireless network topology, G=(N,E), is given by a node set N and a (directed) edge set E corresponding to pairs (i,j) of access points and user nodes within direct communication range. A node can be either an access point or a client device, which is referred to herein generally as a client node. Let the set of access point nodes be denoted by E and the set of client nodes by U. Thus, N=A∪U. Each node in the network can be a source or destination of traffic. Let Ai be the set of access point nodes that are within range of client node i. Each client node i∈U has a desirable download rate $r_i^D$ and upload rate $r_i^U$. For the channelization scenarios considered, the edge set E is modified to include channel information (the notation for this will be introduced in the respective sections).

The available spectrum is assumed to be divided into K channels, where a channel is the lowest granularity at which spectrum can be allocated. Time is divided into slots and the transmission/reception at a node during each time slot can be on all or a subset of channels, depending on the scenario considered. Thus, the link transmission scheduling problem involves a two-dimensional space of frequency and time.

Let $\lambda$ denote the throughput for the given client uplink and downlink rates, i.e., the uplink rates $\lambda r^U$ and downlink rates $\lambda r^D$ are feasible for the given access point infrastructure and client node distribution. The problem of maximizing the throughput $\lambda$ is considered. Clearly, if the maximum throughput $\lambda$ is at least 1, then the given uplink and downlink rates are achievable.

Model of Interference

A protocol model of interference is used. Let $d_{ij}$ denote the distance between nodes i and j. Let a radio, for example, at node i have a communication range of $l_i$ and potentially larger interference range $l_i'$. Under the protocol model of interference (See P. Gupta and P. R. Kumar, "The Capacity of Wireless Networks," *IEEE Transactions on Information Theory*, vol. 34, no. 5, pp. 910-917, 2000.), if there is a single wireless channel, a transmission from node i to node j is successful if (i) $d_{ij} \leq l_i$ (receiver is within communication range of sender), and (ii) any node k, such that $d_{kj} \leq l_k'$, is not transmitting (receiver is free of interference from any other possible sender).

Requirement (i) is modeled through links in a topology graph. Model requirement (ii) is modeled using a conflict graph. It should be noted that requirement (ii) includes, as a special case, a constraint that a node may not send and receive at the same time nor transmit to more than one other node at the same time—these are the transmit/receive diversity constraints.

The definition of a successful transmission under the protocol model of interference can be made more restrictive in order to accommodate the MAC (Medium Access Control) protocol in the IEEE 802.11 wireless networking standard (See M. Gast, 802.11 *Wireless Networks: The Definitive Guide*, O'Reilly and Associates, 2002) that performs virtual sensing through exchange of RTS/CTS (Request to Send/Clear to Send) messages and requires the receiver to send an acknowledgement after successful transmission. In this case, the sending node i should also be free from interference from nodes other than the receiving node j, since the receiver will be sending acknowledgements or a CTS message that should be received successfully by the sender. This is modeled by adding a third constraint for a successful transmission from node i to node j:

(iii) any node k, such that $d_{ki} \leq l_k'$, is not transmitting (sender is also free of interference from any other possible sender).

For the rest of this disclosure, it is assumed that the first (less restrictive) model of interference where there are no RTS/CTS or acknowledgement messages is used. Adding the additional constraint to model the latter merely introduces additional edges in the conflict graph—the overall method works for any given conflict graph and hence does not change.

Link Transmission Scheduling

In order to accommodate transmit/receive diversity and link interference for an omnidirectional antenna in the modeling framework, a linear relaxation of the scheduling constraints is used and incorporated into the linear programming formulations. This approach has been used for wireless mesh networks (See K. Jain, J. Padhye, V. N. Padmanabhan, L. Qiu, "Impact of Interference on Multi-hop Wireless Network Performance," ACM MOBICOM 2003, September 2003). This technique is first reviewed. In the discussion below, every node transmits on the same channel.

The topology graph G=(N,E) includes links e=(i,j), which denotes transmission from node i to node j. The transmission rate on link e is denoted by $u_e$.

Conflict Graph for Link Transmissions

The approach noted above uses a conflict graph to model the phenomenon of link interference under the protocol model of interference. This graph is denoted by $F_1=(N_c, A_c)$. The vertices of $F_1$ correspond to links E in the topology graph G, i.e., $N_c=E$. There is an (undirected) edge between two nodes in the conflict graph corresponding to communication links (i,j) and (i',j') if $$d_{ij'} \leq l_i' \text{ or } d_{i'j} \leq l_i'.$$

This corresponds to the fact that the two links cannot be active simultaneously, i.e., they interfere and violate requirement (ii) in the protocol model of interference described above.

Figures 1, 3:
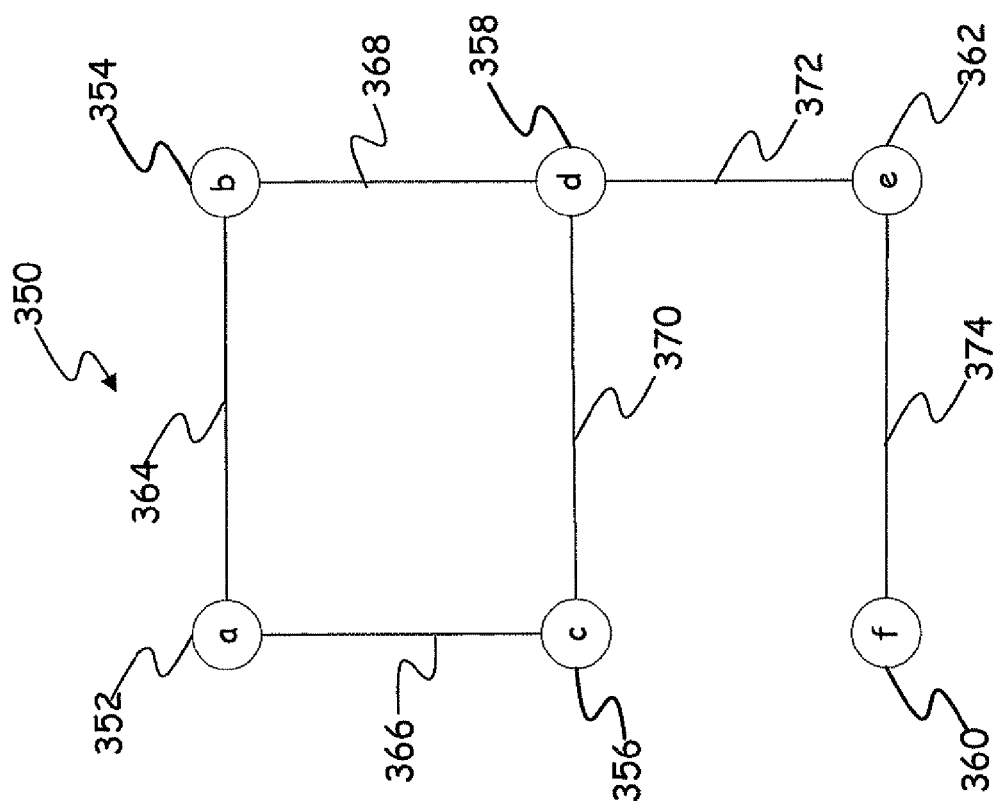
Figures 2, 3:
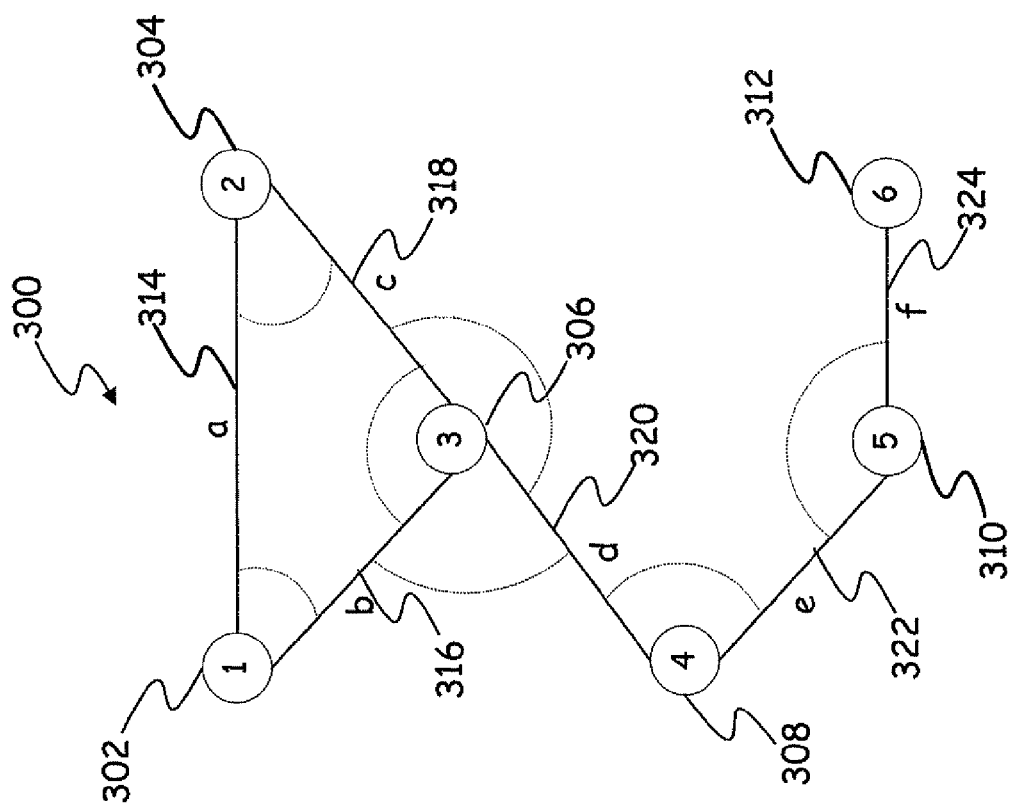

In FIG. 3-1, an example topology graph 300 showing network connectivity is provided. FIG. 3-2 shows a conflict graph 350 (which is a specific example of conflict graph $F_1$) that corresponds to the topology graph 300. The conflict graph is generated to incorporate wireless interference into the problem formulation. Here, the terms "node" and "link" are used in reference to the topology graph while the terms "vertex" and "edge" are reserved for the conflict graph. As can be seen in FIG. 3-1, topology graph 300 includes 6 nodes numbered 302 through 312 and six links numbered 314 through 324. The dotted arcs in topology graph 300 join interfering link pairs. In conflict graph 350, each of vertices 352 through 362 correspond to a different one of links 314 through 324 in topology graph 300. Edges in conflict graph 350 are numbered 364 through 374. In general, in connection with a conflict graph, the term "clique" is used to refer to a group of vertices which are all connected together, and the term "independent set" applies to a set of vertices that are not connected to each other.

Scheduling link transmissions for transmit/receive diversity and link interference can be modeled using constraints corresponding to either cliques or independent sets in the conflict graph. This is discussed next.

Clique Constraints for Link Transmission Scheduling

Consider a clique in the conflict graph. Let C be the set of topology links that correspond to nodes of this clique in the conflict graph. Let $x_e$ be the traffic on link e (recall that $u_e$ is the rate of transmission on link e). The fraction of time that link e is active is $x_e/u_e$. Since the links in C mutually conflict with each other, at most one of them can be active at any given time. This can be modeled by the constraint $$\sum_{e \in C} \frac{x_e}{u_e} \leq 1$$

Constraints of this type can be added for each clique C in the conflict graph. Moreover, it is sufficient to add just constraints corresponding to maximal cliques (cliques whose size cannot be increased by adding more nodes), since the constraints corresponding to cliques contained inside maximal cliques are redundant.

The clique constraints, however, provide only necessary conditions for the link rates to have a realizable schedule—these conditions may not be sufficient. Thus, the throughput obtained by adding all maximal clique constraints may be a strict upper bound on the maximum achievable throughput. Utilization constraints for other types of subgraphs in the conflict graph may need to be added, e.g., an odd length cycle with no chords, referred to as an odd hole. The sum of the utilizations of the links corresponding to the vertices of an odd hole of length a in the conflict graph can be at most $$\left[\frac{a}{2}\right].$$

Constraints corresponding to other types of subgraphs in the conflict graph may also need to be added.

The throughput upper bound based only on maximal clique constraints is tight only for a particular class of conflict graphs called perfect graphs. Perfect graphs are characterized by the following property: for all induced subgraphs, the chromatic number is equal to the clique number (size of largest clique).

Independent Set Constraints for Link Transmission Scheduling

Consider an independent set of vertices in the conflict graph. These correspond to links in the topology graph that can be active simultaneously. An independent set is said to be active at any given time if some subset of the corresponding links are active. Let $I_1, I_2, \ldots I_p$ denote all the maximal independent sets in the conflict graph (let each set include corresponding links in the topology graph). Let independent set $I_j$ be active for $b_j$ fraction of the time. Any set of actively transmitting links are contained in some independent set (in case there are multiple such independent sets, one set can arbitrarily be chosen). Then, it should follow that $$\sum_{j=1}^{p} b_j \leq 1$$

For an individual link, the fraction of time it is active is at most the sum of the fraction of time that each independent set it belongs to is active. This can be written as $$\frac{x_e}{u_e} \leq \sum_{j: I_j \ni e} b_j$$

It is seen that the above constraints provide a set of necessary and sufficient conditions for link rates to be schedulable in the protocol model of interference.

Channelization Using Contiguous Channel Bands

In this case, a user node can communicate with an access point on some contiguous channel band r=[a, b] in any time slot, where $1 \leq a \leq b \leq K$. (It is assumed that the channels are labeled in increasing order of center frequency.) Similarly, on the access point side, it can communicate with a user node on some contiguous channel band in any time slot. The link set $E_2$ in the topology graph $G_2=(N, E_2)$ includes links e=(i,j,r) which denotes transmission from node i to node j on contiguous channel r, where one of the nodes is an access point node and the other is a user node.

The problem involves scheduling of spectrum-time blocks for access point to user communication in the two-dimensional space of frequency and time. This allows fine grained utilization of the available spectrum (versus multiplexing in the frequency domain only) and can be realized, for example, by using the PCF (Point Coordination Function) protocol in IEEE 802.11 (See M. Gast, 802.11 Wireless Networks The Definitive Guide, O'Reilly and Associates, 2002).

The transmission rate $u_{ijr}$ from node i to node j on channel band r=[a, b] is expected to be $$u_{ijr} = \sum_{c=a}^{b} u_{ijc}$$

where $u_{ijc}$ is the transmission rate from node i to node j on channel c. In the following formulation, the above-noted transmission rate is not assumed, but instead given transmission rates $u_{ijr}$ from node i to node j on channel band r are used.

The number of possible contiguous channel bands r=[a, b], $1 \leq a \leq b \leq K$, on K available channels is K(K+1)/2. Thus, this approach results in a factor of only (K+1)/2 increase in the number of links in the topology graph compared to a multi-channel 802.11 case without communication on a contiguous band of channels.

Conflict Graph for Link Transmissions

A conflict graph $F_2$ for modeling the contiguous channel band case is as follows. There is an (undirected) edge between two nodes in the conflict graph corresponding to communication links (i,j,r) and (i',j',r') if $r \cap r' \neq \phi$(channel bands intersect), and $d_{ij'} \leq l_i'$, or $d_{i'j} \leq l_{i'}'$.

This corresponds to the fact that the two links cannot be active simultaneously if their channel bands have at least one channel in common, and the receiver on either link is within interference range of the transmitter on the other link.

Figures 1, 4:
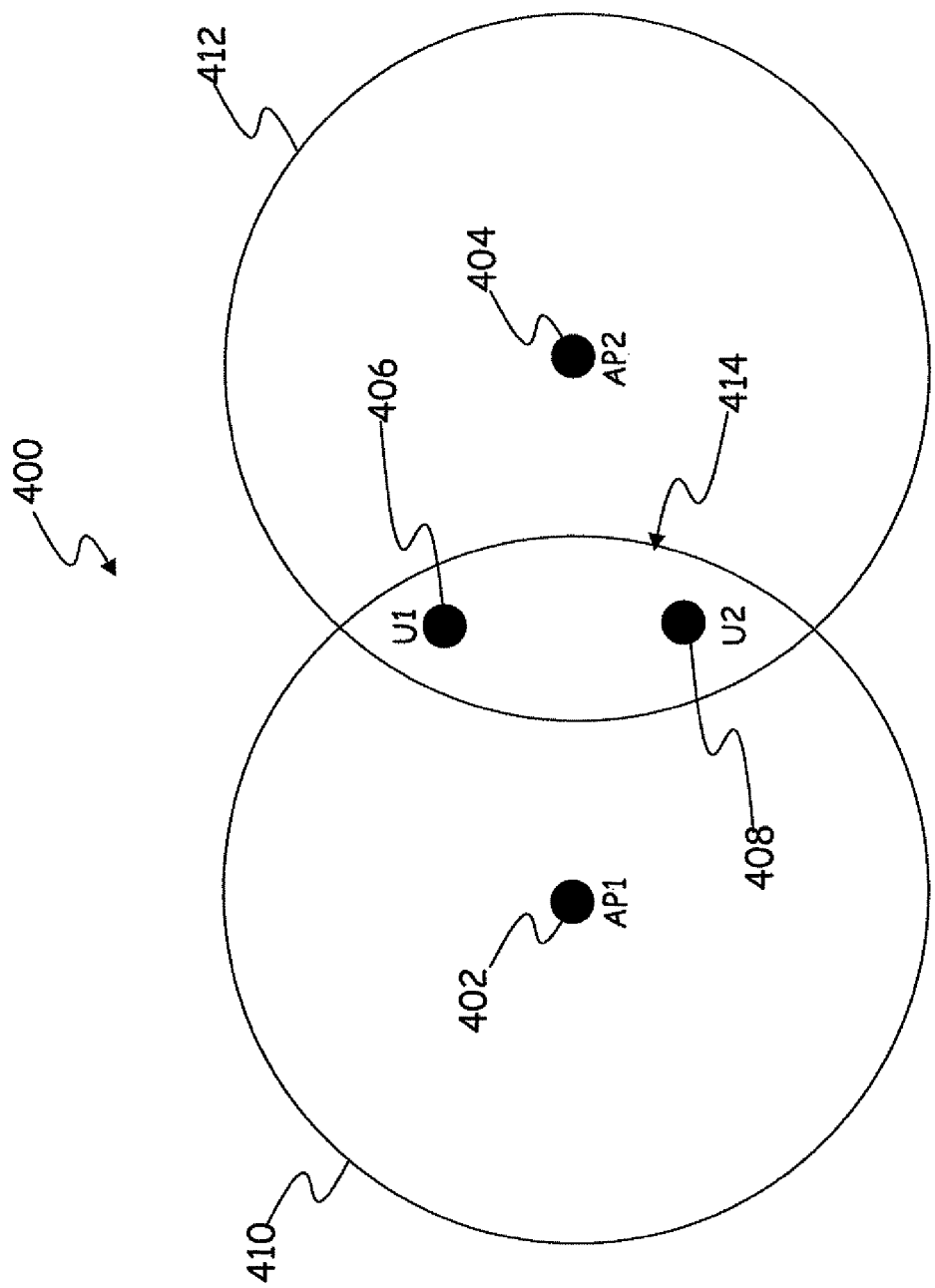
Figures 2, 4:
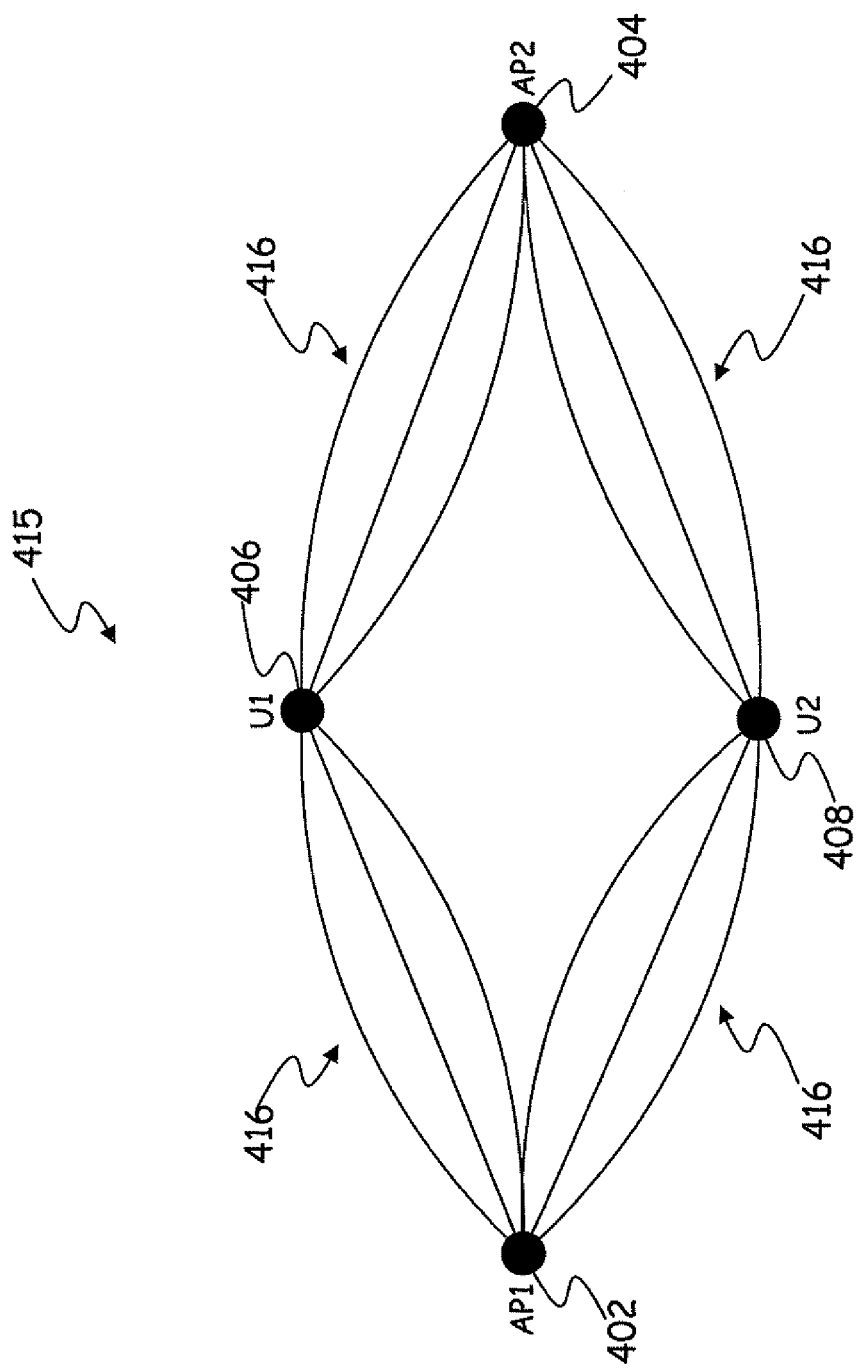
Figures 3, 4:
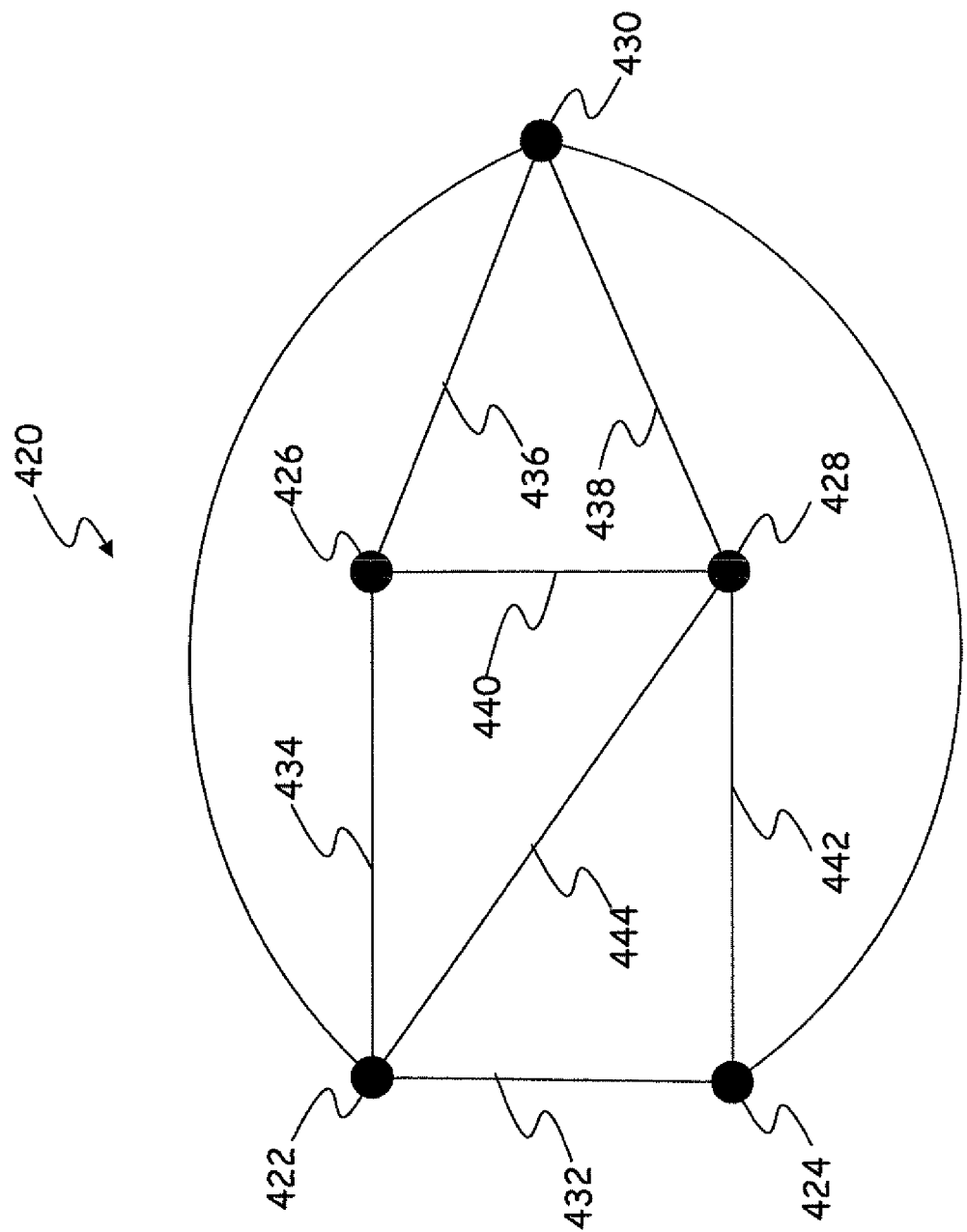

FIGS. 4-1 through 4-3 demonstrate how a conflict graph for contiguous channel band allocation can be constructed. Specifically, FIG. 4-3 shows a portion of a conflict graph (which is a specific example of conflict graph $F_2$), which is constructed from a topology graph shown in FIG. 4-2 that represents the network shown in FIG. 4-1. As can be seen in FIG. 4-1, network 400 includes two access points 402 (AP1) and 404 (AP2) and two user nodes 406 (U1) and 408 (U2). Circles 410 and 412 represent communication range limits of access points access points 402 and 404. As can be seen in FIG. 4-1, user nodes 406 and 408 are in a communication range overlap region 414 and therefore are each capable of communicating with both access points 402 and 404. For the example shown in FIGS. 4-1 through 4-3, the number of communication channels K=3 (channels 1, 2 and 3).

FIG. 4-2 is a topology graph 415 of network 400. As can be seen in FIG. 4-2, each of user nodes 406 and 408 can communicate with each of access points 402 and 404, respectively, via three (bi-directional) communication links. For simplification, all links are denoted by the same reference numeral 416. A comparison between topology graph 415 and topology graph 300 of FIG. 3-1 shows a substantially greater potential for wireless interference in the multi-channel network represented in FIG. 4-2. A portion of a conflict graph, which incorporates wireless interference in the network represented in FIG. 4-2, is shown in FIG. 4-3. Vertices 422 through 430 of conflict graph 420, correspond to different links 416 of topology graph 415 of FIG. 4-2. Edges 432 through 444 are contiguity constraint arcs and edges 446 and 448 are wireless interference arcs.

Maximizing Throughput

Let $x_{ijr}$ be the fraction of time that link (i,j,r) is active. (The version using clique constraints is the only one described.) The linear relaxation of the scheduling constraints associated with the conflict graph $F_2$ above is used and incorporated as link utilization constraints into the linear programming formulation. The overall approach is to first solve the resulting linear program and then schedule the channel band transmissions for each access point. The latter scheduling problem is NP-hard—however, greedy scheduling works well in practice for general wireless link interference problems, i.e., the decrease in throughput (obtained by the linear program) is not significant after performing the time slot scheduling.

The problem of maximizing throughput for the contiguous channel band case can be formulated as the following linear program.

Maximize $\lambda$ subject to $$\sum_{r} \sum_{j \in A_i} u_{jir} x_{jir} = \lambda r_i^D \forall i \in U \qquad \text{Equation (1)}$$

$$\sum_{r} \sum_{j \in A_i} u_{jir} x_{jir} = \lambda r_i^U \forall i \in U \qquad \text{Equation (1)}$$

$$\sum_{(i,j,r) \in C} x_{ijr} \leq 1 \forall \text{ cliques } C \text{ in } F_2 \qquad \text{Equation (3)}$$

From the above equations, it can be noticed that the discrete nature of the channel band contiguity constraints have been moved into the topology graph, so that the variables in the linear program remain continuous. This is significant since the running time of Integer Linear Programs (ILPs) scale poorly with increasing problem size, even with commercial grade ILP solvers like CPLEX (See ILOG CPLEX Optimization Suite, http://www.ilog.com/cplex).

Specific types of cliques in the conflict graph correspond to transmit/receive diversity constraints at each node. It is useful to write these down explicitly.

$C_i = \{(i,j,r) | \forall j \text{ s.t.}(i,j) \in E,$ $r=[a,b], 1 \leq a \leq K\} \cup$ $\{(j,i,r) \forall j \text{ s.t.}(j,i) \in E,$ $r=[a,b], 1 \leq a \leq K\} \forall i \in N$ Restricting the Number of Channels Used in a Single Transmission Due to practical limitations (imposed by, for example, hardware or software considerations), it may be necessary to restrict the number of contiguous channels used in a single transmission to at most some number 1. This is relatively easily handled in the framework by considering only those channel bands r=[a, b] for which b−a+1≦1.

Channelization Using Non-Contiguous Channel Bands

In WiMAX, for example, a user node can communicate with a base station on some subset of channels in a time slot. On the base station side, it can communicate with multiple users on non-intersecting channel subsets in any time slot. The link set $E_3$ in the topology graph $G_3=(N, E_3)$ includes links e=(i,j,c) which denotes transmission from node i to node j on channel (or code) c, where one of the nodes is an access point node and the other is a user node.

In general, the appearance of topology graphs for contiguous and non-contiguous channel band communication and identical for identical networks. However, the non-contiguous channel band case can differ in the following two ways:
1) Outgoing links from an access point on different channels (to the same or different user nodes) can be active simultaneously. This is similar for the incoming links at access points.
2) Outgoing links from a user node to the same access point but on different channels can be active simultaneously. This is similar for the incoming links at a user node.

Under item 2 above, a user node is not allowed to communicate with multiple access points in the same time slot. This restriction is imposed by the current WiMAX architecture. However, the present embodiments can be modified to remove such a restriction without departing from the scope and spirit of the disclosure.

Conflict Graph for Link Transmissions

A conflict graph F3 for modeling the non-contiguous channel band case is constructed according to the following rules. There is an (undirected) edge between two nodes in the conflict graph corresponding to communication links (i,j,c) and (i',j',c') if any of the following hold:
  i=i' is an access point, and c=c' (access point transmitting to two user nodes on same channel/code)
  j=j' is an access point, and c=c' (access point receiving from two users on same channel/code)
  i=i' is a user node, and j≠j' (user node transmitting to two access points in same time slot)
  j=j' is a user node, and i≠i' (user node receiving from two access points in same time slot)
  i=j' or j=i' (transmit-receive diversity)
  c=c', and $d_{ij} \leq l_i'$ (link interference)

Figures 1, 5:
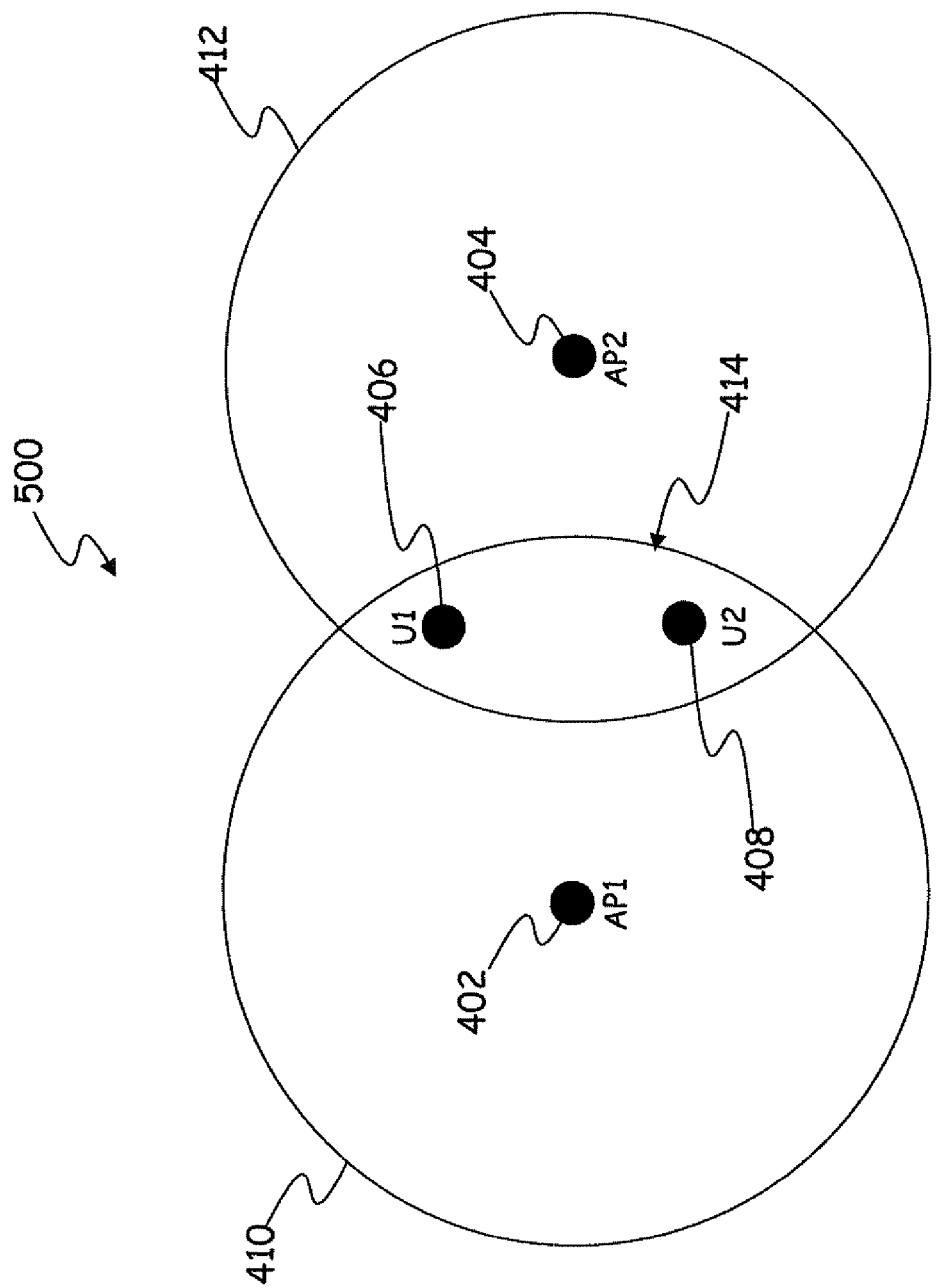
Figures 2, 5:
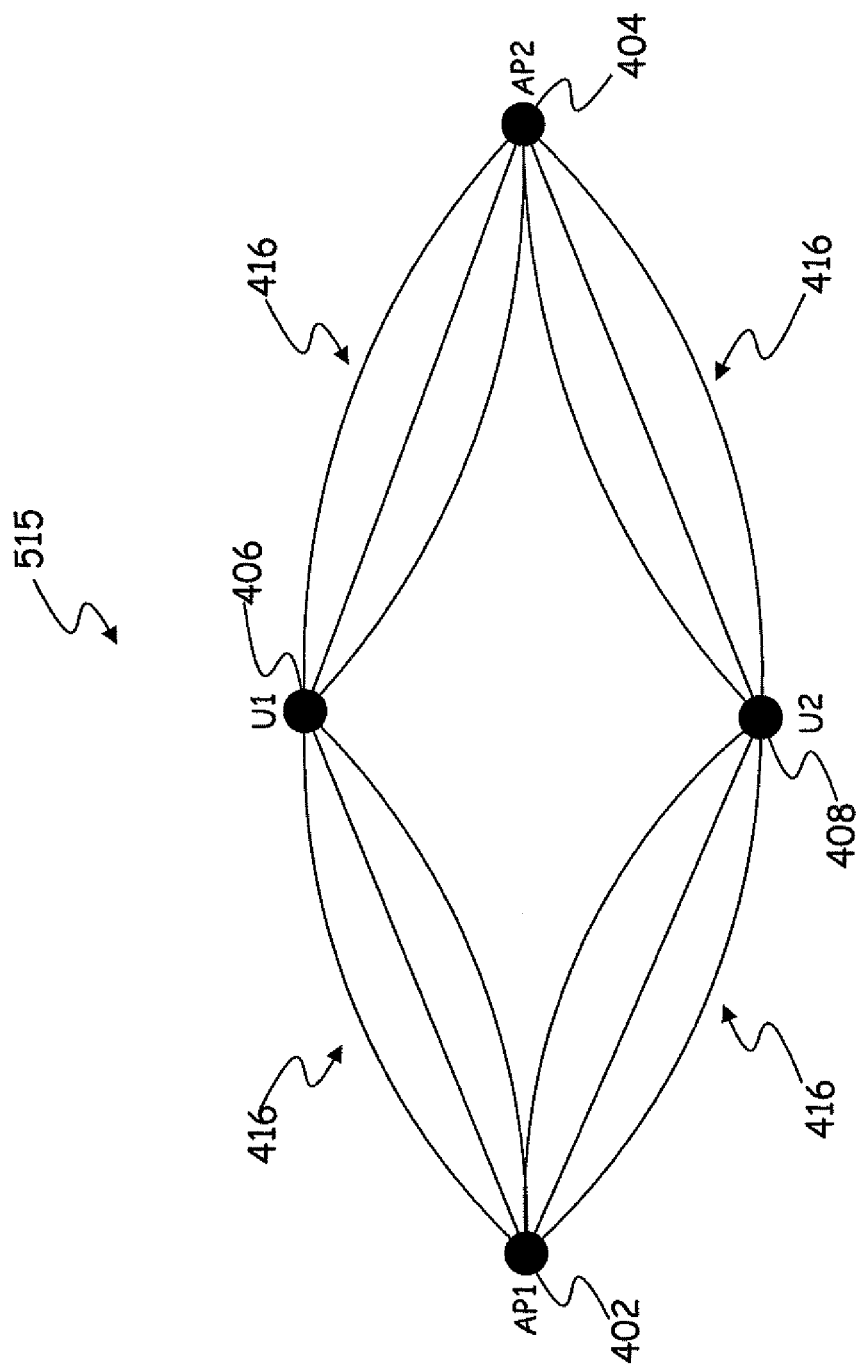
Figures 3, 5:
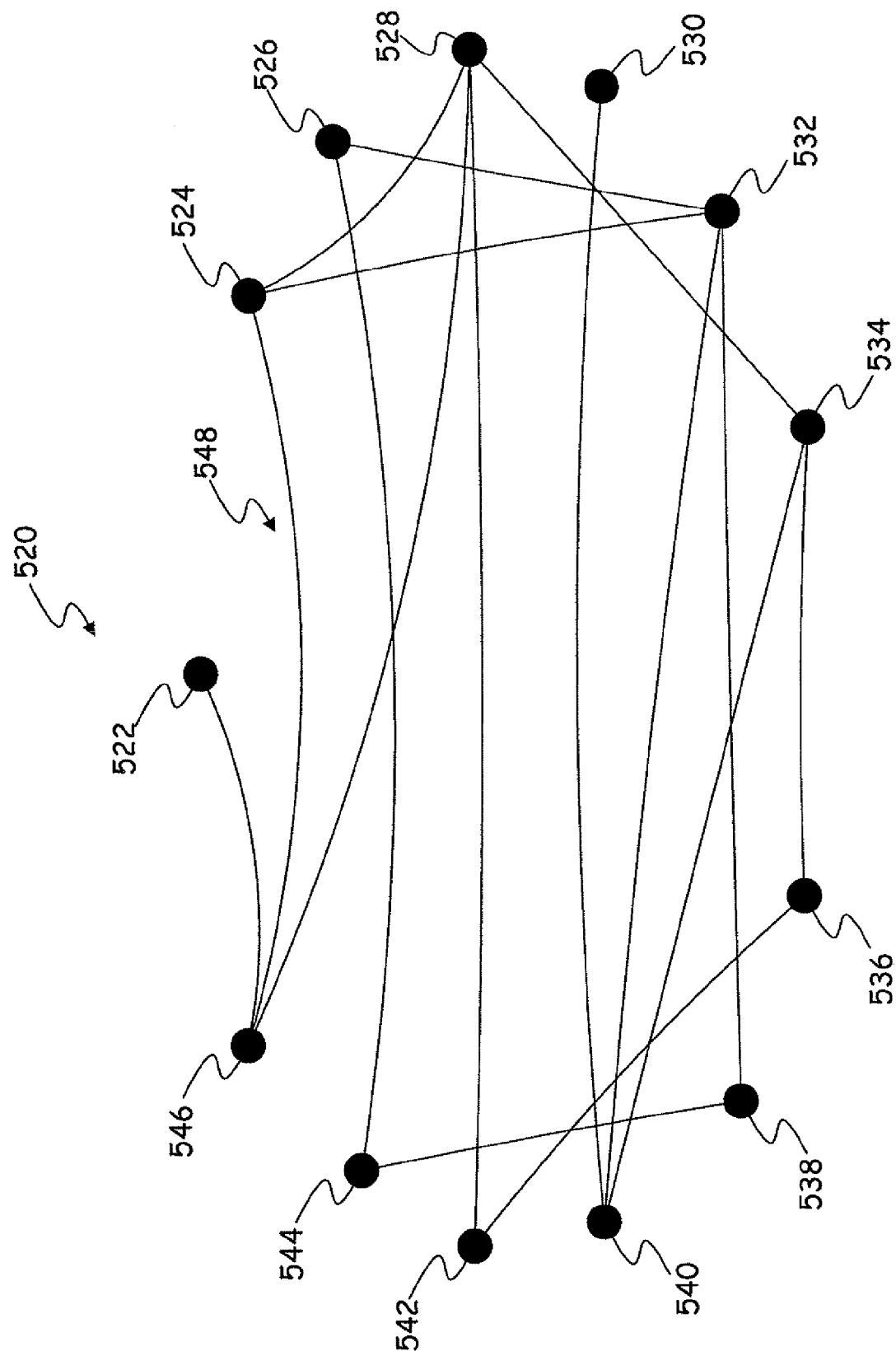

FIGS. 5-1 through 5-3 demonstrate how a conflict graph for non-contiguous channel band allocation can be constructed. Specifically, FIG. 5-3 shows a portion of a conflict graph (which is a specific example of conflict graph F3), which is constructed from a topology graph shown in FIG. 5-2 that represents the network shown in FIG. 5-1. Since network 500 (FIG. 5-1) and its corresponding topology graph 515 (FIG. 5-2) are the same as network 400 (FIG. 4-1) and its corresponding topology graph 415 (FIG. 4-2), the earlier-included description of FIGS. 4-1 and 4-2 also applies to FIGS. 5-1 and 5-2. A portion of a conflict graph, which incorporates wireless interference in the network represented in FIG. 5-2, is shown in FIG. 5-3. Vertices 522 through 546 of conflict graph 520 correspond to different links 416 of topology graph 515 of FIG. 4-2. Edges 548 (all denoted by the same reference numeral in the interest of simplification) do not contain any contiguity constraint arcs due to the lack of a contiguous channel band constraint in this embodiment.

Maximizing Throughput

The problem of maximizing throughput can be formulated as the following linear program. Let $x_{ijc}$ be the capacity usage on link (i,j,c) and let the corresponding transmission rate be $u_{ijc}$. (The version using clique constraints is the only one described.)

Maximize $\lambda$
subject to $$\sum_{c=1}^{K}\sum_{j \in A_i} x_{jic} = \lambda r_i^D \forall\, i \in U \qquad \text{Equation (4)}$$

$$\sum_{c=1}^{K}\sum_{j \in A_i} x_{ijc} = \lambda r_i^D \forall\, i \in U \qquad \text{Equation (5)}$$

$$\sum_{(i,j,c) \in C} \frac{x_{ijc}}{u_{ijc}} \leq 1 \forall\, \text{cliques } C \text{ in } F_3 \qquad \text{Equation (6)}$$

Specific types of cliques in the conflict graph correspond to transmit/receive diversity constraints at each node. Cliques associated with each access point i∈A and channel pairs $c_1, c_2$ are given by $$C_i^{c_1,c_2} = \{(i,j,c_1) | \forall j\, s.t.\, (i,j) \in E\} \cup$$

$$\{(j,i,c_2) | \forall j\, s.t.\, (j,i) \in E\} \forall i \in A,$$

$$1 \leq C1, C2 \leq K$$

Cliques associated with each user i∈U could be more in number. Consider a user node i with degree $d_i$ and adjacent nodes $j_1, j_2, \ldots, j_{d_i}$. Let $\bar{c}=(c_1, c_2, \ldots, c_{d_i})$ denote a di-tuple in $\{1, 2, \ldots, K\}^{d_i}$. Then, for a given user node i and tuples $\bar{c}$, $\bar{c}'$, the associated clique is given by $$C_i^{\bar{c},\bar{c}'} = \{(i,j_k,c_k) | 1 \leq k \leq d_i\} \cup$$

$$\{(j_k,i,c_k') | 1 \leq k \leq d_i\} \forall i \in U,$$

$$\forall \bar{c},\bar{c}' \in \{1, 2, \ldots, K\}^{d_i}$$

Restricting Number of Channels (Codes) Used in a Single Transmission

Due to practical limitations (imposed by, for example, hardware or software considerations), it may be necessary to restrict the number of channels (or codes) used in a single transmission to at most some number 1. This can be handled in the framework by a node-splitting transformation as follows. Split each user node i into 1 sub-nodes labeled $i_1, i_2, \ldots, i_1$. Each link in the original graph between each access point and node i is replicated at each sub-node $i_k$ in the transformed graph. Restricting the number of channels used for a single communication between node i and an access point is equivalent to imposing the following restrictions on the sub-nodes $i_k$:
  Each sub-node can use exactly a single channel (code) in a single communication with an access point.
  Different sub-nodes must use different channels (codes) during concurrent communications with the same access point.
  Concurrent transmission at one sub-node and receiving at another sub-node is not allowed. (This corresponds to a transmit/receive diversity constraints at node i.)

Figures 1, 6:
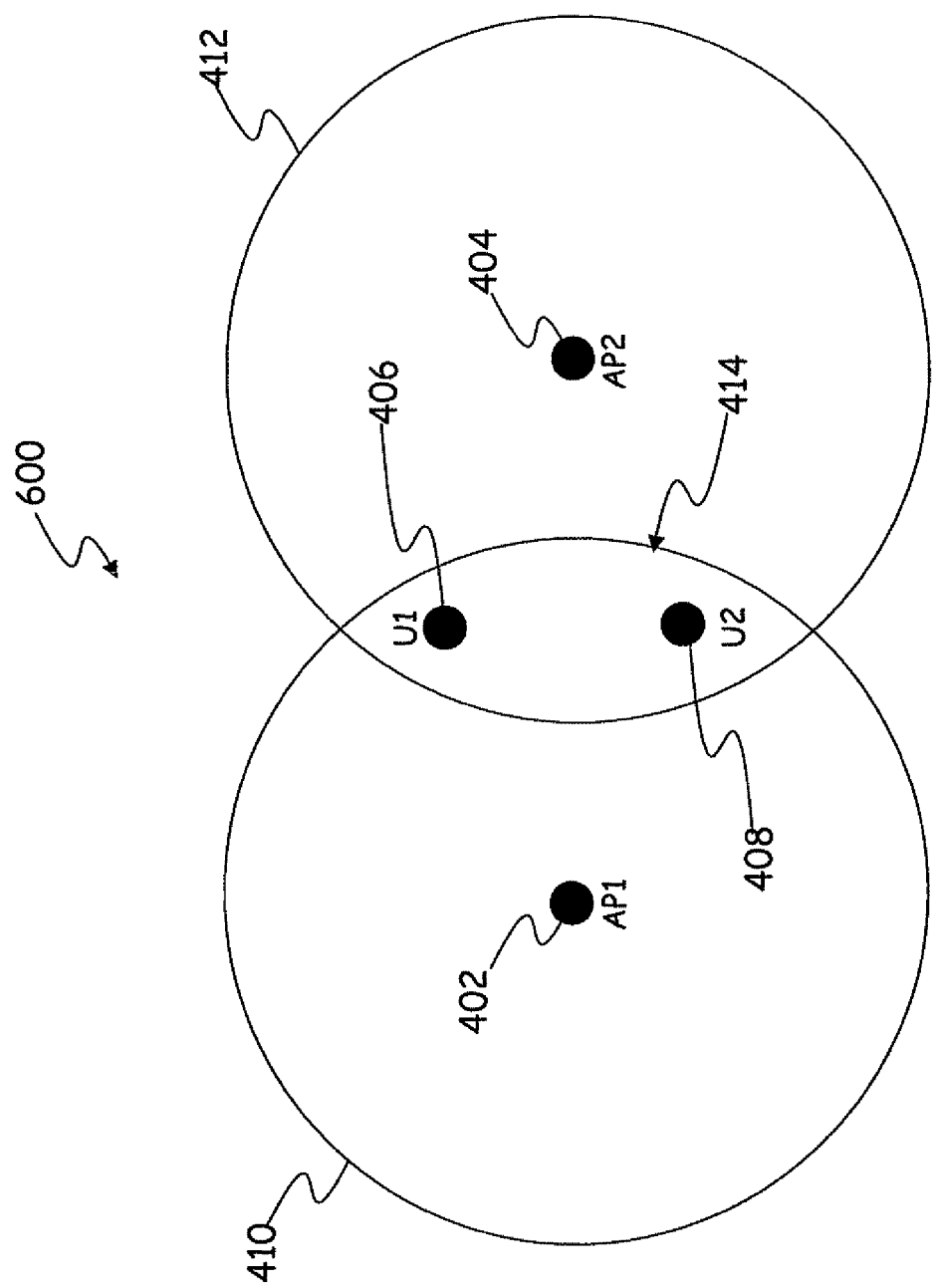
Figures 2, 6:
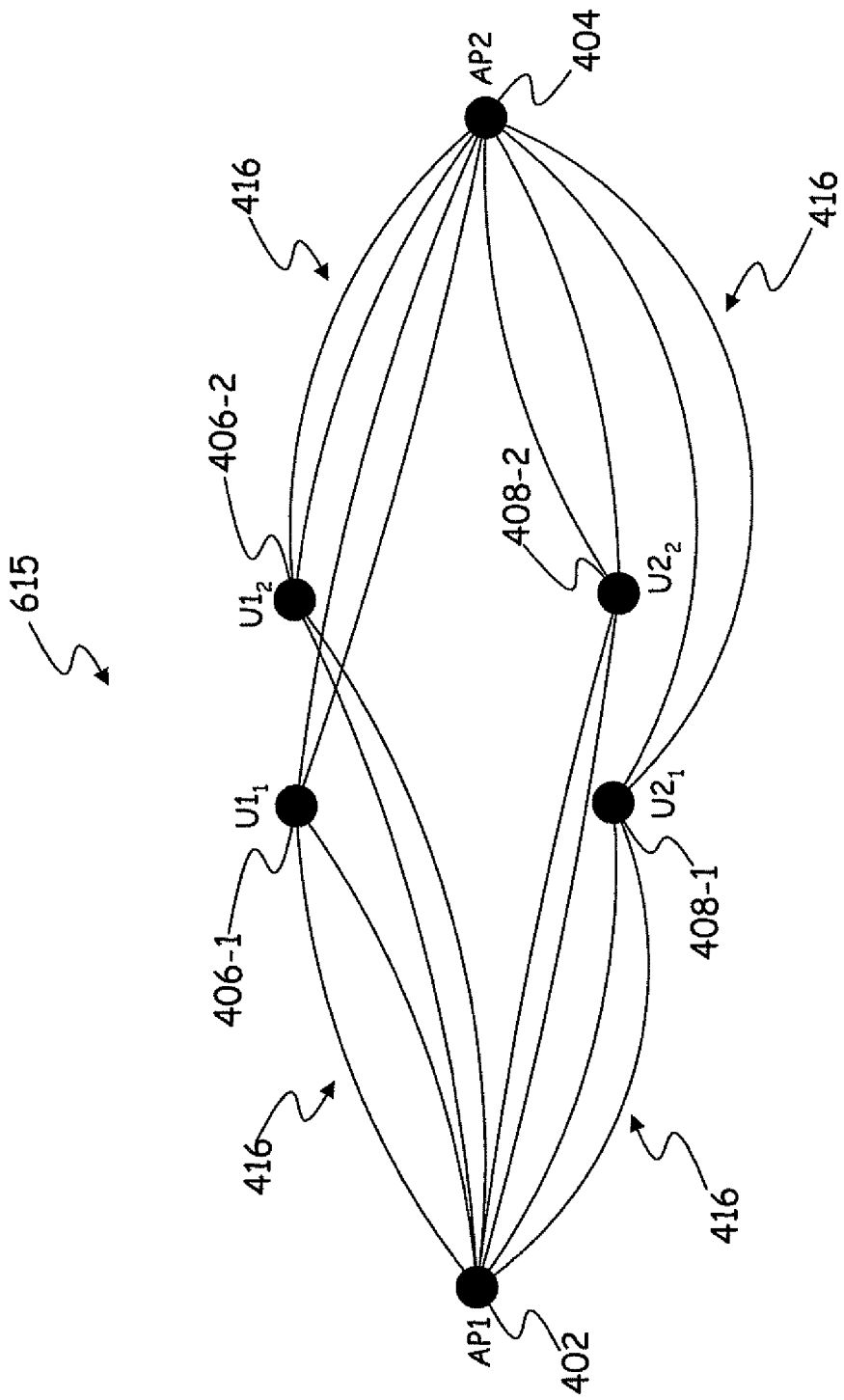

FIGS. 6-1 and 6-2 show a network 600 and its corresponding topology graph 615. Network 600 is substantially similar to networks 500 in which non-contiguous channel band allocation is used. However, in network 600, although the number of the number of communication channels K=3, the maximum number of channels that can be used is a single communication l=2. Thus, topology graph 615 shows only two links between any user node and access point. Also, in topology graph 615, user nodes U1 and U2 are each split into sub-nodes 406-1 ($U1_1$) and 46-2 ($U1_2$), and 408-1 ($U2_1$) and 408-2 ($U2_2$), respectively. A conflict graph, similar to graph 520 (FIG. 5-3), with the additional restriction of l=2, can be constructed.

The above restrictions are modeled through edges in the conflict graph. Let the conflict graph for this case be $F_4$.

To obtain the linear programming formulation in this case, upload and download rate variables $y_{ik}^U$, $y_{ik}^D$ for each sub-node and constraints corresponding to the fact that the total (upload/download) rate over all sub-nodes should equal the (upload/download) rate for that node are added. The linear programming formulation now becomes:

Maximize $\lambda$
subject to $$\sum_{c=1}^{K} \sum_{j \in A_i} x_{ji_k c} = y_{i_k}^D \forall\ 1 \le k \le l,\ i \in U \quad \text{Equation (7)}$$

$$\sum_{c=1}^{K} \sum_{j \in A_i} x_{i_k jc} = y_{i_k}^U \forall\ 1 \le k \le l,\ i \in U \quad \text{Equation (8)}$$

$$\sum_{k=1}^{l} y_{i_k}^D = \lambda r_i^D \forall\ i \in U \quad \text{Equation (9)}$$

$$\sum_{k=1}^{l} y_{i_k}^U = \lambda r_i^D \forall\ i \in U \quad \text{Equation (10)}$$

$$\sum_{(i,j,c) \in C} \frac{x_{ijc}}{u_{ijc}} \le 1 \forall\ \text{cliques } C \text{ in } F_4 \quad \text{Equation (11)}$$

Formulation with Unknown User Locations

In this section, the case when user locations are not known a priori is considered. Since user locations are unknown, an interference due to upload transmissions from a user node cannot be modeled. Hence, only user download rates will be considered in this case.

Let $u_{ir}$ be the transmission rate from node i to node j on channel band r. Let $d_i$ be the total user download rate from access point i. The throughput is the maximum multiplier $\lambda$ such that download rates $\lambda d_i$ can be supported. A linear programming formulation is provided for the contiguous channel band case.

Let (i,r) denote transmission from access point i on some contiguous channel band r=[a, b]. The conflict graph $F_5$ includes nodes (i,r). There is an (undirected) edge between two nodes (i,r) and (j,r') in the conflict graph if r∪r'≠φ (channel bands intersect), there could be a user node associated with access point i that is within interference range of access point j, or vice versa.

It should be noted that the second condition above is conservative since user locations are not provided (there could be situations when there is no such user in the system).

Figures 1, 7:
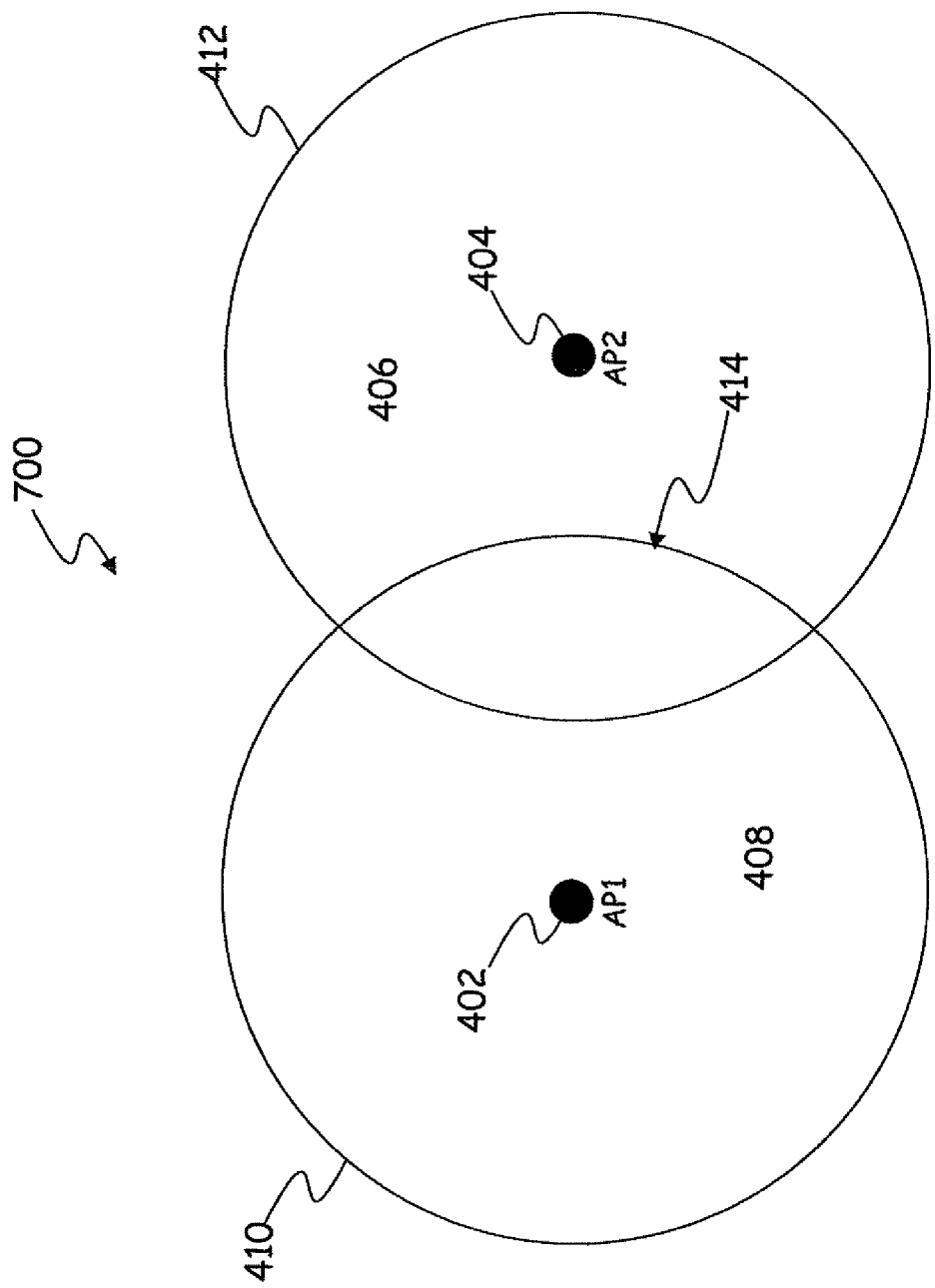
Figures 2, 7:
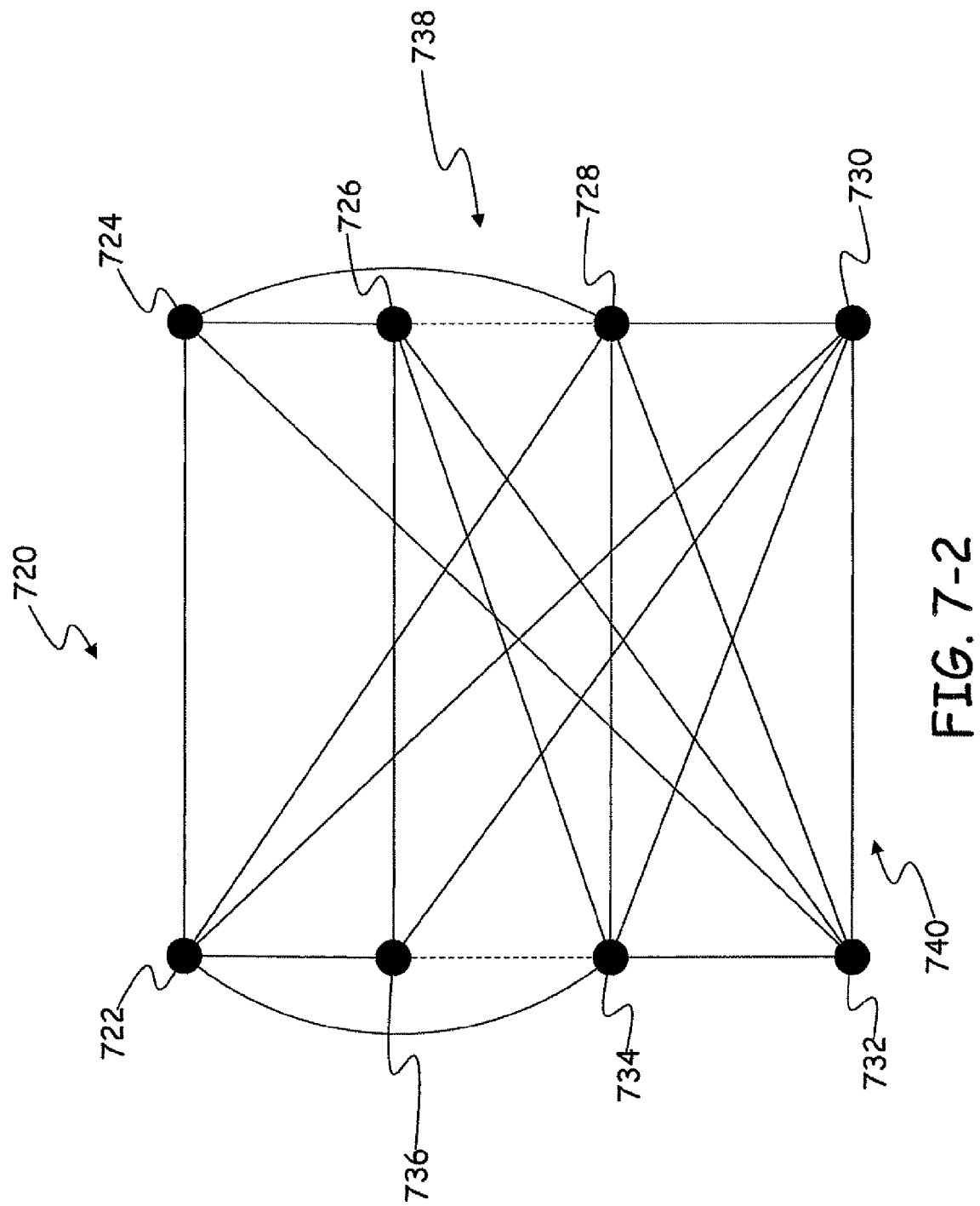

FIGS. 7-1 and 7-2 show a network 700 and its corresponding conflict graph 720, which is a specific example of conflict graph $F_5$. No user nodes are shown in network 700 because, in this embodiment, the user locations are unknown. A portion of a conflict graph, which incorporates wireless interference in the network of FIG. 7-1, is shown in FIG. 7-2. Vertices in conflict graph 720 are denoted by reference numerals 722 through 736. Edges 738 are contiguity constraint arcs and edges 740 are wireless interference arcs.

Let $y_{ir}$ be the fraction of time that access point i transmits on channel band r. The problem of maximizing throughput for the contiguous channel band case when user locations are unknown can be formulated as the following linear program. (As before, only the version using clique constraints is given.)

Maximize $\lambda$
subject to $$\sum_{r} u_{ir} y_{ir} \ge \lambda d_i \forall\ i \in A \quad \text{Equation (12)}$$

$$\sum_{(i,r) \in C} y_{ir} \le 1 \forall\ \text{cliques } C \text{ in } F_3 \quad \text{Equation (13)}$$

It should be noted that if the $y_{ir}$ variables are restricted to be 0-1, then the resulting ILP gives fixed channel width allocations across time, hence this involves multiplexing only in the frequency domain. Since the 0-1 variable values in this case imply channel allocation across time, the clique constraints can be simplified as follows. For each pair (i,j) of conflicting access points i, j and intersecting channel bands r, r', r∪r'≠φ, $$y_{ir} + y_{jr} \le 1$$

The formulation for the non-contiguous channel band case can be obtained in an analogous manner. Here, instead of channel bands r, channels (or codes) c are used in the formulation.

Let (i,c) denote transmission from access point i on some channel (or code) c. The conflict graph F6 includes nodes (i,c). There is an (undirected) edge between two nodes (i,c) and (j,c') in the conflict graph if c=c' (transmission on same channel or code), there could be a user node associated with access point i that is within interference range of access point j, or vice versa.

It should be noted that the second condition above is conservative since user locations are not provided (there could be situations when there is no such user in the system).

Figures 1, 8:
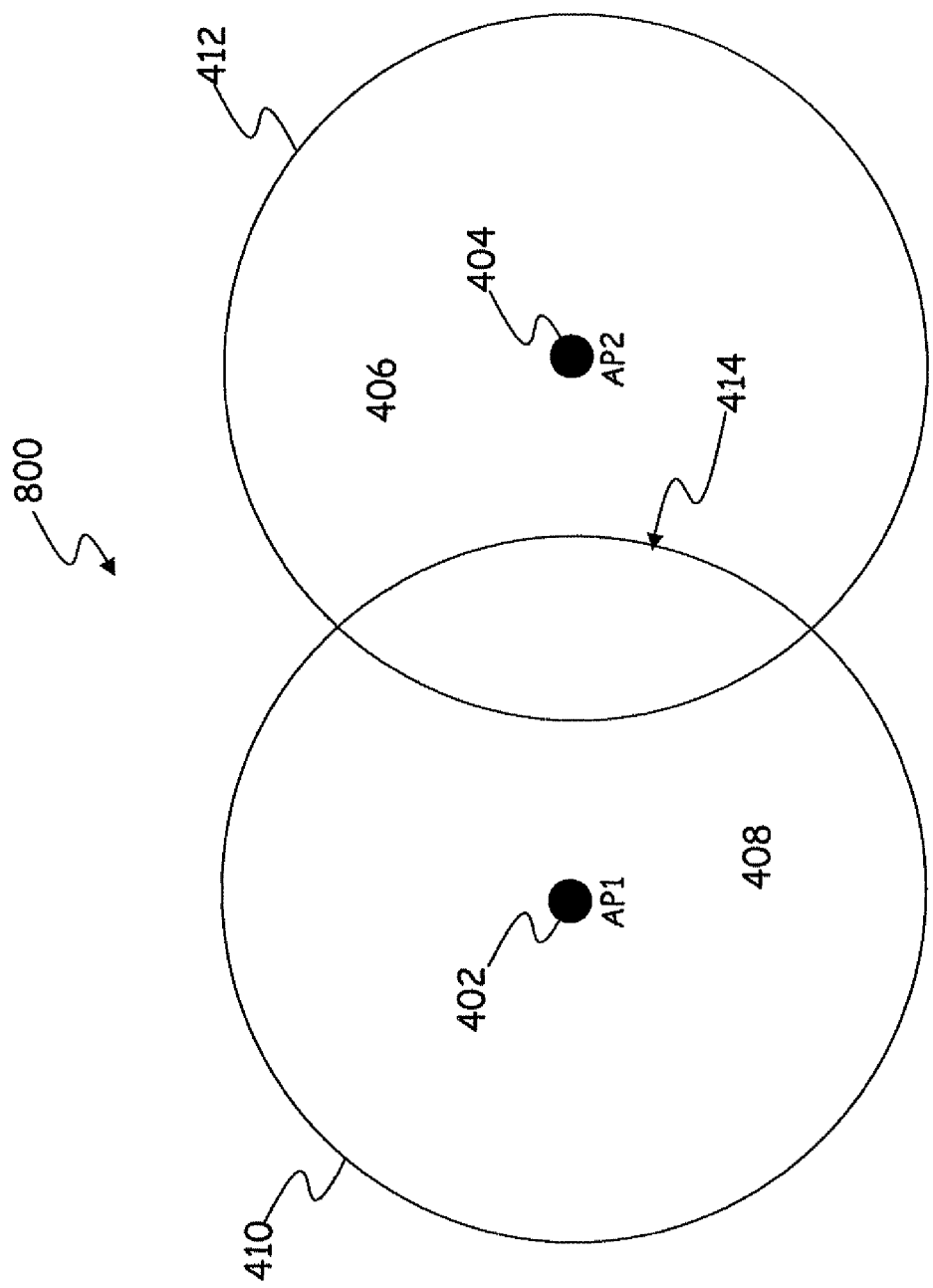

FIGS. 8-1 and 8-2 show a network 800 (which is the same as network 700) and its corresponding conflict graph 820, which is a specific example of conflict graph F6. A portion of a conflict graph, which incorporates wireless interference in the network of FIG. 8-1, is shown in FIG. 8-2. Vertices in conflict graph 820 are denoted by reference numerals 822 through 830. Edges 832 (all denoted by the same reference numeral in the interest of simplification) do not contain any contiguity constraint arcs due to the lack of a contiguous channel band constraint in this embodiment.

Let $y_{ic}$ be the fraction of time that access point transmits on channel C. The problem of maximizing throughput when user locations are unknown can be formulated as the following linear program. (As before, only the version using clique constraints is given.)

Maximize λ
subject to $$\sum_{c=1}^{K} u_{ic} y_{ic} \geq \lambda d_i \forall\ i \in A \qquad \text{Equation (12)}$$

$$\sum_{(i,c) \in C} y_{ic} \leq 1 \forall\ \text{cliques } C \text{ in } F_6 \qquad \text{Equation (13)}$$

It should be noted that if $y_{ic}$ variables are restricted to be 0-1, the resulting ILP gives fixed channel allocations across time, hence this involves multiplexing only in the frequency domain. Since the 0-1 variable values in this case imply channel allocation across time, the clique constraints can be simplified as follows. For each pair (i,j) of conflicting access points i, j and any channel c, $$y_{ic} + y_{jc} \leq 1$$

Figure 9:
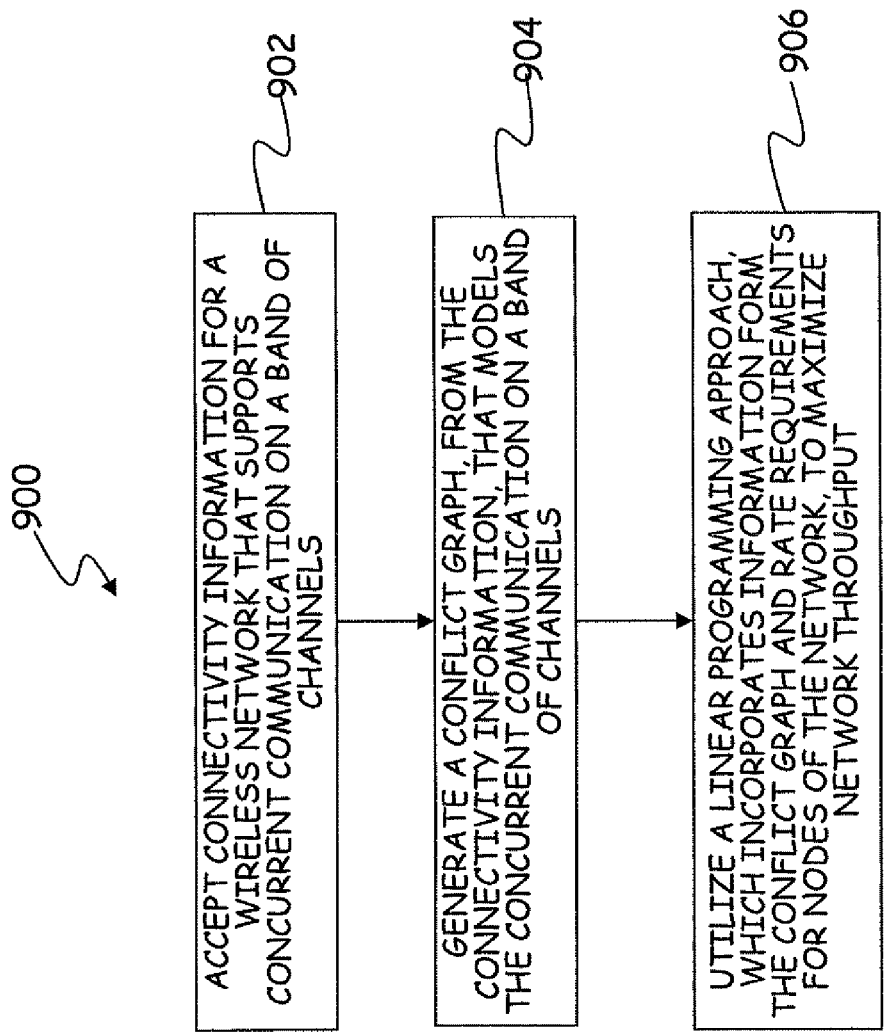
FIG. 9 is a flowchart of a method embodiment.

In conclusion, referring now to FIG. 9, a simplified flow diagram 900 of a method embodiment is provided. A first step 902 in the method of FIG. 9 involves accepting connectivity information for a wireless network that supports concurrent communication on a band of channels. At step 904, a conflict graph is generated from the connectivity information. The generated conflict graph models the concurrent communication on the band of channels. Step 906 involves utilizing a linear programming approach, which incorporates information form the conflict graph and rate requirements for nodes of the network, to maximize network throughput.

Figure 10:
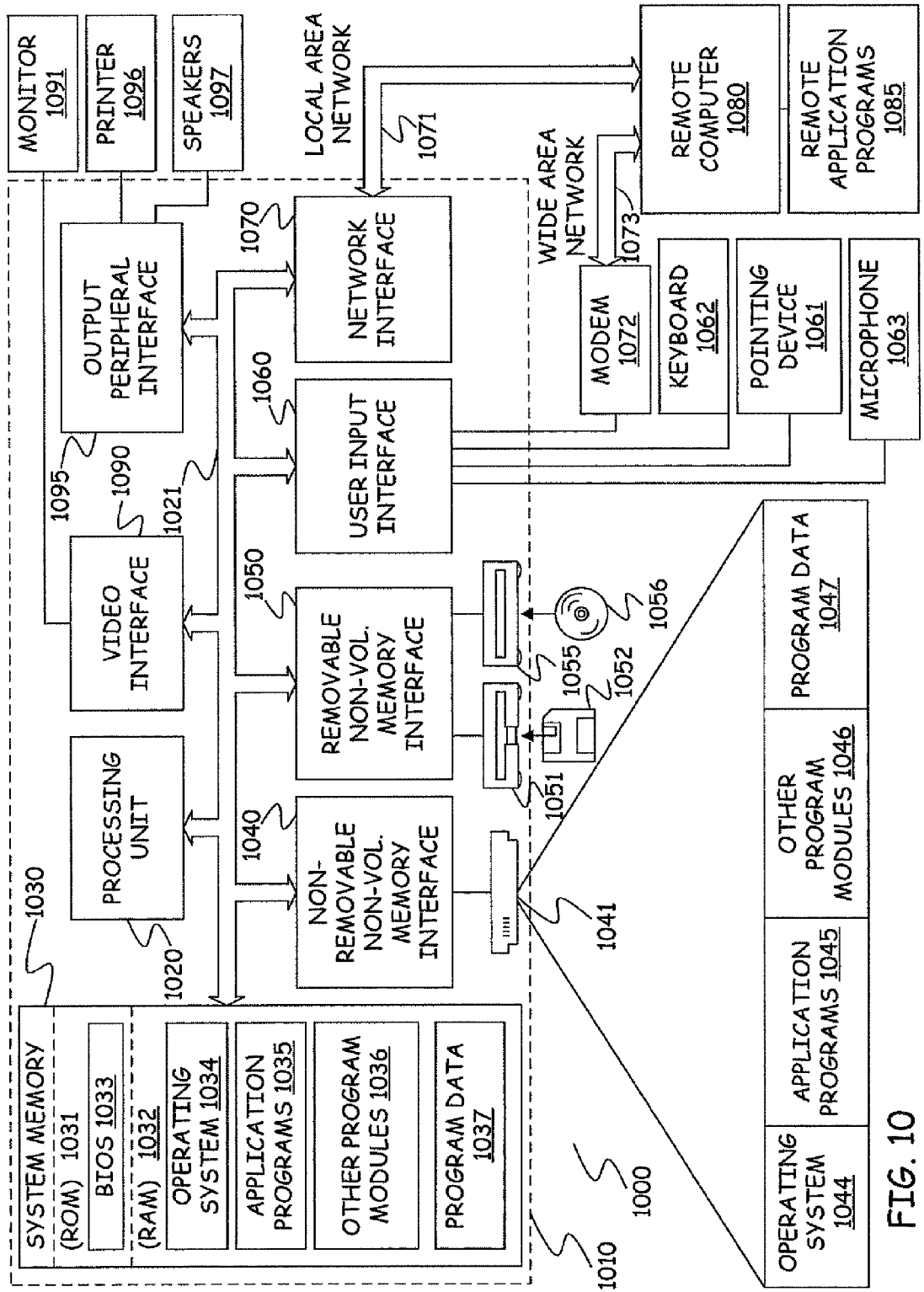
FIG. 10 is a block diagram that illustrates an example of a suitable computing system environment on which some of the present embodiments may be implemented.

FIG. 10 illustrates an example of a suitable computing system environment 1000 on which above-described embodiments may be implemented. The computing system environment 1000 is only one example of a suitable computing environment and is not intended to suggest any limitation as to the scope of use or functionality of the claimed subject matter. Neither should the computing environment 1000 be interpreted as having any dependency or requirement relating to any one or combination of components illustrated in the exemplary operating environment 1000. Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, televisions, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 10, an exemplary system for implementing some embodiments includes a general-purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. Still other input devices (not shown) can include non-human sensors for temperature, pressure, humidity, vibration, rotation, etc. These and other input devices are often connected to the processing unit 1020 through a user input interface 1060 that is coupled to the system bus, but may be connected by other interface and bus structures, such as a parallel port, game port or a USB. A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections to one or more remote computers, such as a remote computer 1080. The remote computer 1080 may be a personal computer, a hand-held device, a server, a router, a network PC, a peer device or other common network node, and typically includes many or all of the elements described above relative to the computer 1010. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on remote computer 1080. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of performing time-slot allocation, comprising:
   accepting connectivity information for a wireless network that supports concurrent communication on a band of channels;
   generating a conflict graph from the connectivity information that models concurrent communication on the band of channels, the conflict graph including vertices that represent communication links and edges that represent interference between the vertices, the vertices including at least one clique that includes a portion of the vertices that are connected together by the edges, the vertices also including at least one independent set that includes another portion of the vertices that are not connected together by any of the edges; and
   utilizing a computer processor to, based at least in part on the at least one clique and the at least one independent set of the conflict graph, change the width of a channel in the band and also make a time-slot scheduling change in relation to the band.

2. The method of claim 1 wherein the concurrent communication on the band of channels is contiguous channel band communication, wherein making a time-slot scheduling change further comprises altering time-slot scheduling relative to a plurality of contiguous channels, and wherein the at least one clique is subject to a limitation:

$$\sum_{e \in C} \frac{x_e}{u_e} \leq 1$$

in which e is an active link, $X_e$ is traffic on the active link, $u_e$ is a rate of transmission on the active link, and C is a set of topology links that corresponds to the at least one clique.

3. The method of claim 1 wherein the concurrent communication on the band of channels is non-contiguous channel band communication, wherein making a time-slot scheduling change further comprises altering time-slot scheduling relative to a plurality of non-contiguous channels, and wherein a product of network throughput times transmission rates of the communication links is optimized.

4. The method of claim 1 wherein the connectivity information is represented as a topology graph that include nodes, links, and contiguity constraint arcs, the nodes representing access points and user nodes, the links representing the communication links between the nodes, the contiguity constraint arcs representing contiguous channel band constraints, and wherein generating a conflict graph from the connectivity information comprises generating the conflict graph from the topology graph.

5. The method of claim 1 wherein the wireless network is an access point type wireless network that includes multiple wireless access points and multiple user nodes, and wherein the access point type wireless network includes an IEEE 802.11, a WiMAX, or a CDMA network.

6. The method of claim 5 and further comprising utilizing a linear programming approach, which incorporates information form the conflict graph, to maximize network throughput, wherein at least one of the multiple user nodes is represented in a topology graph as two sub-nodes, wherein the wireless network is the IEEE 802.11 network, and wherein a Medium Access Control ("MAC") protocol is accommodated by utilizing Request to Send ("RTS") and Clear to Send ("CTS") messages.

7. The method of claim 1 wherein a network management server is utilized to manage client demand information.

8. The method of claim 7 wherein the network management server estimates demand during a particular timeslot and utilizes the estimated demand to extrapolate rate needs for subsequent time slots.

9. The method of claim 6 wherein a location of the at least one user node is determined utilizing triangulation, and wherein a Point Coordination Function ("PCF") protocol in the IEEE 802.11 network is utilized to provide fine grained utilization.

10. The method of claim 9 and further comprising formulating a constraint for a rate requirement for the at least one user node as a function of network throughput, and wherein a number of contiguous bands is limited by an equation, $r = K(K+1)/2$, in which $r$ is the number of contiguous bands and $K$ is a number of available channels.

11. The method of claim 10 wherein utilizing a linear programming approach comprises incorporating the constraint into a linear program formulated for maximizing the network throughput and solving the linear program utilizing an integer linear program, and wherein the constraint satisfies a transmit/receive diversity requirement at each node.

12. The method of claim 6 wherein locations of more than one of the multiple user nodes are unknown, and wherein a maximum number of channels used in a single transmission is set to a predetermined number.

13. The method of claim 12 and further comprising formulating a constraint for a rate requirement for the multiple user nodes based on a fraction of time, and wherein at least one of the multiple user nodes is modeled as two sub-nodes.

14. The method of claim 6 wherein utilizing a linear programming approach comprises incorporating the constraint into a linear program formulated for maximizing network throughput and solving the linear program to obtain fixed channel width allocations across time, and wherein the fixed channel width allocations are implemented utilizing multiplexing in a frequency domain.

15. A wireless network comprising:
a centralized component that controls communication between access points and user nodes based on instructions developed from a conflict graph that models concurrent communication on a band of channels based on connectivity characteristics of the access points and the user nodes, the centralized component modeling the access points as a predefined number of sub-nodes, and restricting a number of channels that can be used in a communication with any one of the sub-nodes to a value that is less than a total number of available channels, the centralized component adaptively responding to changes in load requirements in the network by dynamically adjusting the band of channels to effectuate different channel allocations and variations in channel width in response to the changes in load requirements, the band of channels being allocated differently for each one of multiple time slots, and at least one of the channels having different center frequency and width values in adjacent time slots.

16. The wireless network of claim 15 wherein the concurrent communication on the band of channels, which the network supports, is contiguous channel band communication, wherein multiple channels have different center frequency and width values in adjacent time slots, and wherein linear programming is utilized to determine upload and download rates for the sub-nodes.

17. The wireless network of claim 15 wherein the concurrent communication on the band of channels, which the network supports, comprises non-contiguous channel band communication, wherein another one of the channels has non-overlapping frequencies in adjacent time slots, and wherein each sub-node utilizes a single code in a communication with one of the sub-nodes.

18. A computer-implemented method for managing resource allocation within an access point type wireless network, comprising:
generating a topology graph that includes nodes, links, and interference arcs, at least two of the nodes having multiple links between the nodes that represent bi-directional communication links, and at least two of the links being connected by one of the interference arcs, each of the interference arcs identifying pairs of the links that interfere with communications of each other; and
utilizing the topology graph to dynamically varying a width of a particular one of a plurality of channels into which a wireless communications spectrum has been divided, the width being varied within a particular one but not all of a plurality of time slots into which the particular channel has been divided.

19. The method of claim 18 wherein dynamically varying the width comprises increasing the width of the particular channel within the particular time slot, wherein the method further comprises utilizing the topology graph to dynamically vary widths of other ones of the plurality of channels, and wherein the method further comprises modeling each of the interference arcs in a conflict graph as an edge that connects at least two of the links.

20. The method of claim 18 wherein dynamically varying the width comprises decreasing the width of the particular channel within the particular time slot, wherein the method further comprises utilizing the topology graph to maintain a width of one of the plurality of channels at a constant value over the plurality of time slots while dynamically changing its center frequency, and wherein at least some of the nodes are modeled as multiple sub-nodes.

* * * * *